United States Patent [19]

Nada

[11] Patent Number: 5,871,002
[45] Date of Patent: Feb. 16, 1999

[54] APPARATUS FOR CONTROLLING IGNITION TIMING IN ENGINES

[75] Inventor: Mitsuhiro Nada, Toyota, Japan

[73] Assignee: Toyota Jidosha Kabushiki Kaisha, Toyota, Japan

[21] Appl. No.: 950,475

[22] Filed: Oct. 15, 1997

[30] Foreign Application Priority Data

Oct. 17, 1996 [JP] Japan .................................... 8-274765

[51] Int. Cl.$^6$ ...................................................... F02P 11/00
[52] U.S. Cl. ........................... 123/609; 123/630; 123/644
[58] Field of Search ................................ 123/179.5, 644, 123/630, 609, 643

[56] References Cited

U.S. PATENT DOCUMENTS

| | | | |
|---|---|---|---|
| 4,367,722 | 1/1983 | Mizuno | 123/630 |
| 4,448,180 | 5/1984 | Bodig et al. | 123/630 |
| 4,690,122 | 9/1987 | Sasakura et al. | 123/609 |
| 4,739,743 | 4/1988 | Iwata | 123/609 |
| 4,854,292 | 8/1989 | Urushiwara et al. | 123/630 |
| 5,301,650 | 4/1994 | Neumayer et al. | 123/630 |

FOREIGN PATENT DOCUMENTS 64-77753  3/1989  Japan .

*Primary Examiner*—Erick R. Solis
*Attorney, Agent, or Firm*—Kenyon & Kenyon

[57] ABSTRACT

An apparatus controls an ignition timing in association with rotation of an engine. The engine has an ignitor, an ignition coil and a spark plug. The ignitor provides the ignition coil with primary current to actuate the ignition coil. The ignition coil provides the spark plug with secondary current to actuate the spark plug when the primary current is cut off. A sensor detects the rotation of the engine by a predetermined angle and outputs a first signal based on the detection. An electronic control unit (ECU) computes an ignition timing of the ignition coil based on the first signal and driving state of the engine. The ECU outputs a second signal to the ignitor to control the primary current provided to the ignition coil. The ECU prohibits a provision of the primary current to the ignition coil when the primary current is provided to the ignition coil for a first predetermined time period. The ECU prohibits the provision of the primary current to the ignition coil based on the second predetermined time period greater than the first predetermined time period, when the engine starts to work.

10 Claims, 28 Drawing Sheets

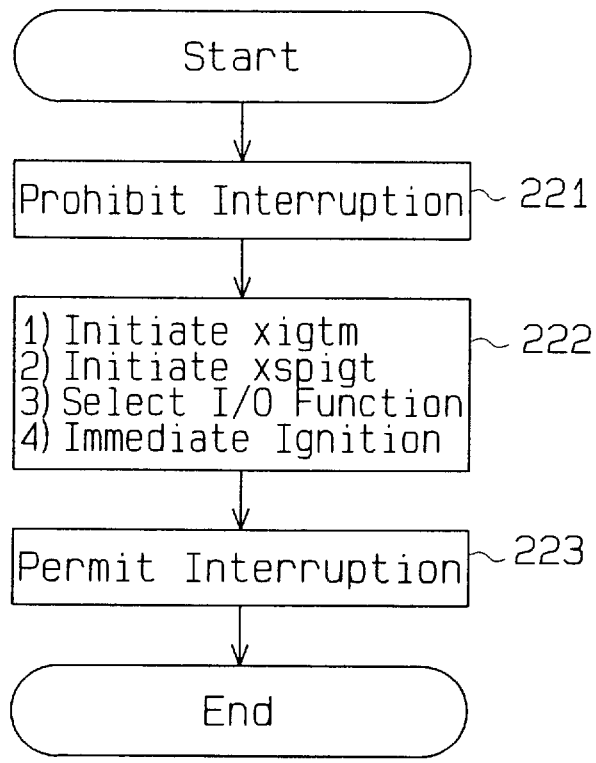
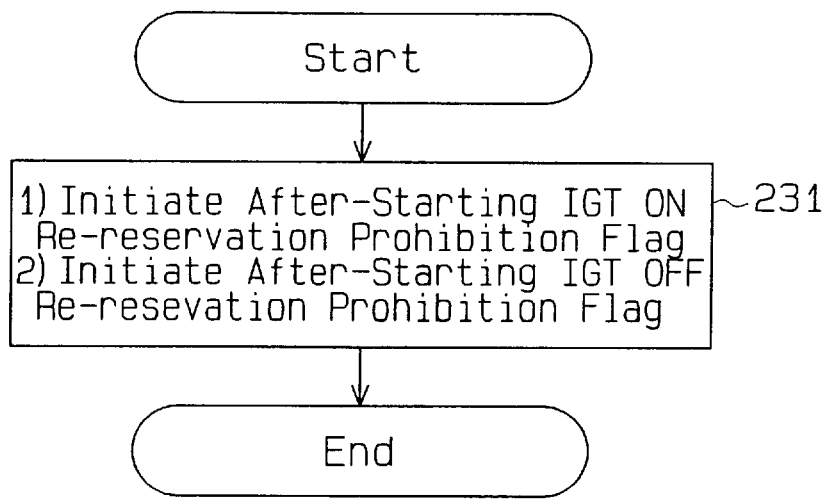

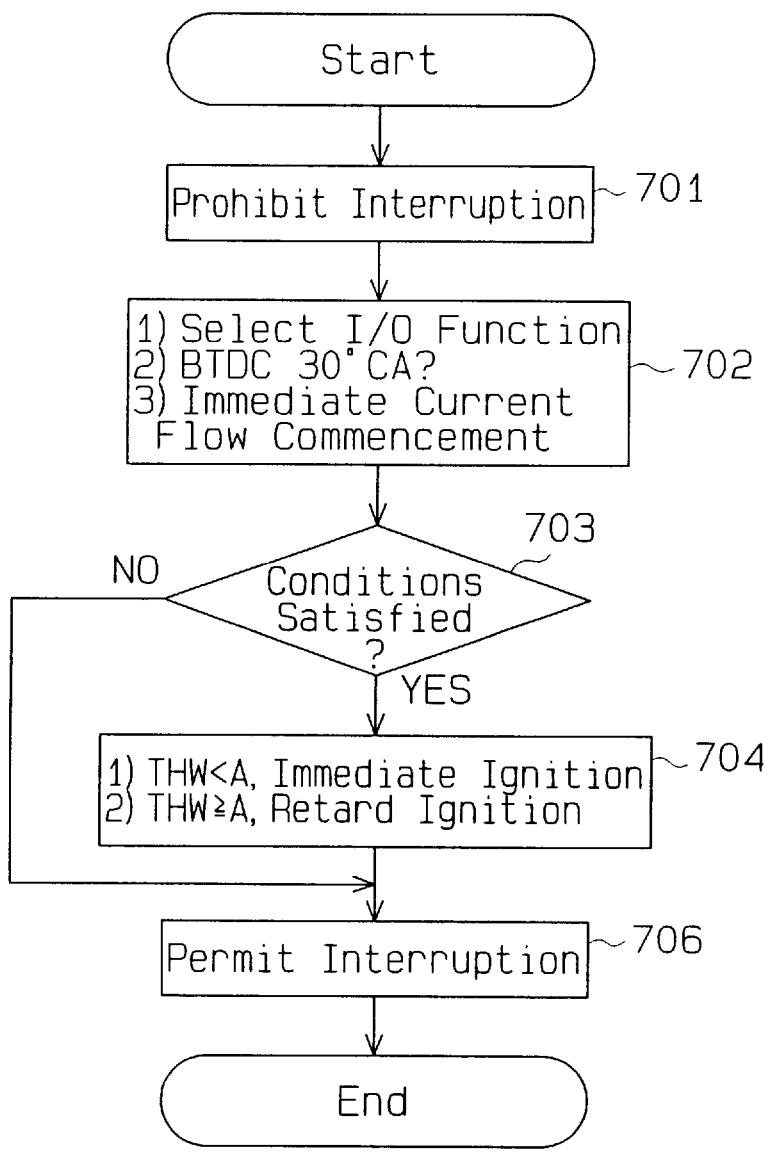

Fig.23

```
                              eccrnka[]
     8  7  6  5  4  3  2  1  0 (Four Cylinders)
           6  5  4  3  2  1  0 (Six Cylinders)
     |  |  |  |  |  |  |  |  |
     BTDC  BTDC  BTDC  BTDC   TDC
     240   180   120    60   Ignition
```

Fig.24

```
     BTDC  BTDC  BTDC  BTDC
     120    90    60    30    TDC
      |     |     |     |     |     |
           eacntcr  :                :
           earstca  :          :
                              Ignition
```

Fig.25

| | Subsequent Igniting cylinder ↓ | | | | | | | |
|---|---|---|---|---|---|---|---|---|
| | TDC | ATDC 30 | ATDC 60 | ATDC 90 | ATDC 120 | ATDC 150 | Ignition TDC | ATDC 30 |
| espki | 1 | 1 | 0 | 0 | 0 | 0 | 0 | 0 | 1 |
| ecatdc | 5 | 0 | 1 | 2 | 3 | 4 | 5 | 0 | 1 |
| eccyl | 3 | 3 | 0 | 0 | 0 | 0 | 0 | 0 | 1 |

APPARATUS FOR CONTROLLING IGNITION TIMING IN ENGINES

BACKGROUND OF THE INVENTION

1. Field of the Invention

The present invention relates to an apparatus for controlling the timing of igniting air-fuel mixture in automobile engines.

2. Description of the Related Art

Japanese Unexamined Patent Publication No. 64-77753 describes a typical electronic spark advance apparatus. The apparatus controls the flow of primary current in an ignition coil based on signals from a control circuit. The control circuit sets the optimum current flow time in correspondence with the operating state of the engine. This determines the optimum ignition timing.

The speed of the engine is extremely slow when the engine is being started or when the engine is about to stall. This leads to current flow that continues for a long period of time. In such case, a current breaker mechanism breaks the flow of the primary current when the current keeps flowing for a predetermined period of time. The breaker mechanism prevents the primary current from being locked in a continuously flowing state. This prevents heating of the ignition coil and power transistors of ignitors.

However, the length of the predetermined time, or current allowance time, is the same regardless of whether the engine is being started or whether the engine is already running. Furthermore, low temperatures degrade the starting performance of the engine and delays increase in the engine speed. Thus, if the engine is being started under low temperature conditions, the current allowance time causes ignition at an undesirable timing. This further degrades the starting performance of the engine.

SUMMARY OF THE INVENTION

Accordingly it is an objective of the present invention to provide an engine ignition timing control apparatus that prevents degradation in tho starting performance of an engine even when starting the engine under low temperature conditions.

To achieve the above objective, the present invention provides an apparatus for controlling an ignition timing in association with rotation of an engine that has an Ignitor, an ignition coil, and a spark plug. The ignitor provides the ignition coil with primary current to actuate the ignition coil. The ignition coil provides the spark plug with secondary current to actuate the spark plug when the primary current is cut off. The apparatus includes a detecting means for detecting the rotation of the engine by a predetermined angle. The detecting means outputs a first signal based on the detection. A computing means computes an ignition timing of the ignition coil. The computing operation is performed based on the first signal and driving state of the engine. The computing means outputs a second signal to the ignitor to control the primary current provided to the ignition coil. A prohibiting means prohibits a provision of the primary current to the ignition coil when the primary current is provided to the ignition coil for a first predetermined time period. A setting means sets a second predetermined time period that is larger than the first predetermined time period. The prohibiting means prohibits the provision of the primary current to the ignition coil based on the second predetermined time period when the engine starts to work.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 12 is a flowchart showing in detail the contents of one of the steps in FIG. 11;

FIG. 13 is also a flowchart showing in detail the contents of one of the steps in FIG. 11;

FIG. 14 is a flowchart showing a routine for processing starting fixed ignition;

FIG. 23 is an explanatory diagram showing the relationship between the TDC and the BTDC for eccrnka;

FIG. 24 is an explanatory diagram showing the relationship between exacter and earstca;

FIG. 25 is an explanatory diagram showing the relationship between espki, ecatdc, and eccyl;

DETAILED DESCRIPTION OF THE PREFERRED EMBODIMENTS

A first embodiment according to the present invention will now be described with reference to FIGS. 1 to 25.

Figure 1:
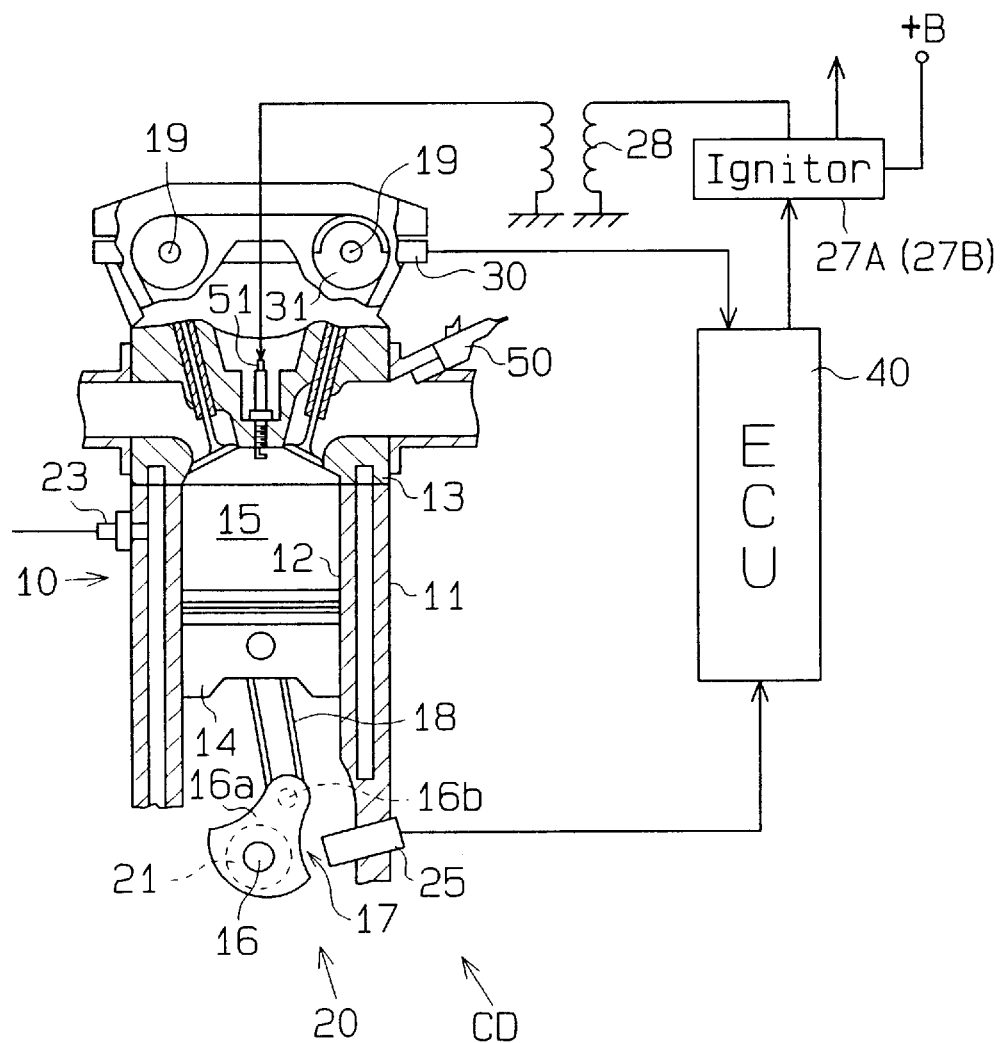
FIG. 1 is a schematic view showing an ignition timing controller according to a first embodiment of the present invention.
Figure 2:
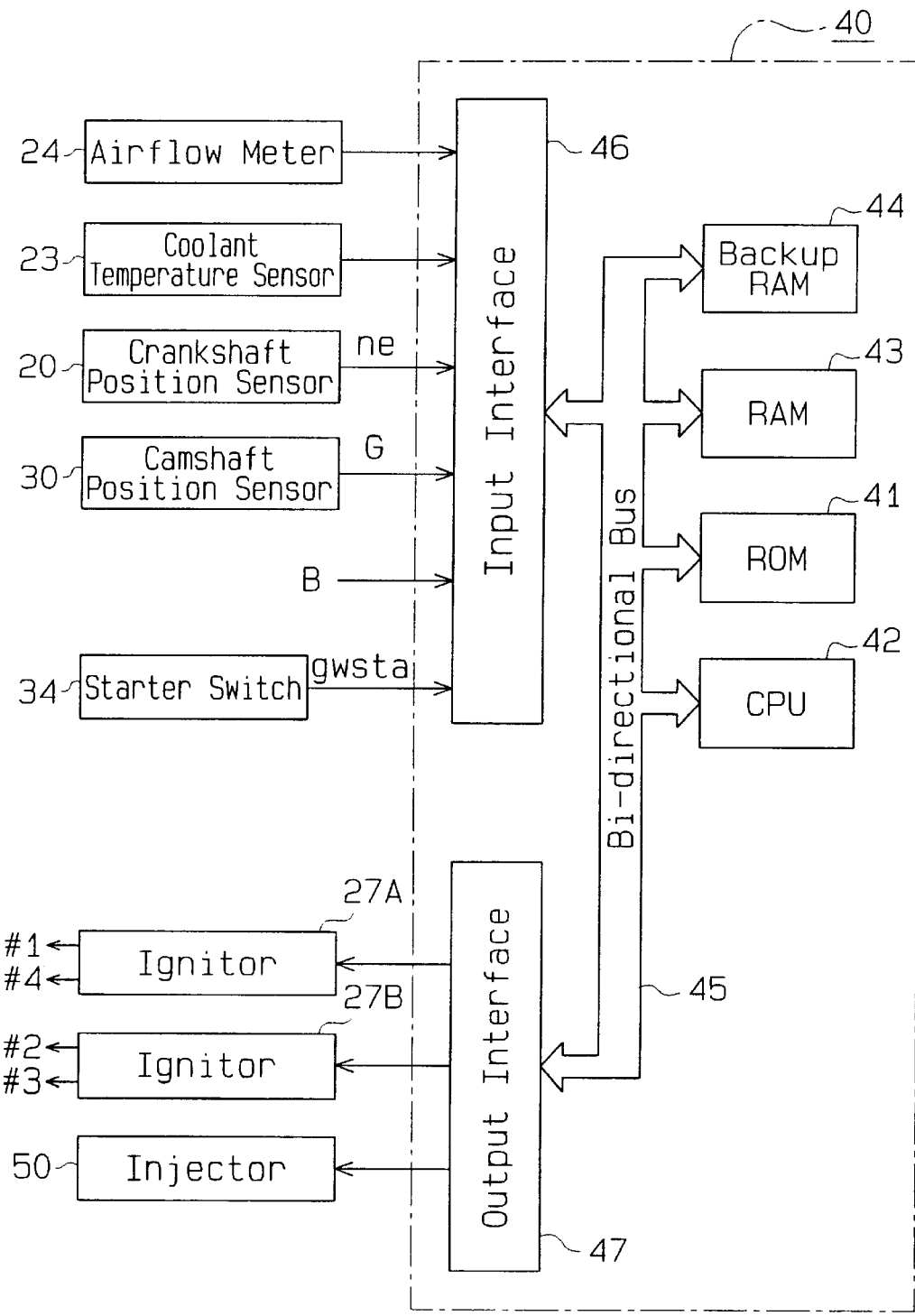
FIG. 2 is an electric block diagram showing the electric structure of an electronic control unit.

This embodiment is applied to an in-line four cylinder engine. FIG. 1 is a schematic view showing one of the cylinders.

An internal combustion engine 10 has a cylinder block 11 provided with four cylinders 12 (first, second, third, and fourth cylinders). A piston 14 reciprocates vertically in each cylinder 12. A combustion chamber 15 is defined between the upper surface of each piston 14, the wall of the associated cylinder 12, and a cylinder head 13. The reciprocating movement of the pistons 14 is converted to the rotating movement of a crankshaft 16. A camshaft 19 is arranged above the cylinder head 13 and connected to the crankshaft 16 by a timing belt (not shown).

The crankshaft 16 has crank arms 16a and crank pins 16b that enable cranks 17 to be located at positions that are eccentric to the axis of the crankshaft 16. Each crank 17 corresponds to one of the cylinders 12. The location of each crank 17 differs from one another. The position of each piston 12 in the associated cylinder 12 is determined by the angle of the crankshaft 17, or the crank angle (CA°).

The bottom end of each piston 14 is connected to the associated crank pin 16b by a connecting rod 18. The reciprocation of the piston 14 rotates the associated crank 17 about the axis of the crankshaft 16. This rotates the crankshaft 16. When assembling the engine 10, the piston 14 in the first cylinder 12 is located at the compression top dead center position.

In the engine 10, the first, second, third, and fourth cylinders 12 are orderly arranged whereas the piston 14 of each cylinder 12 is reciprocated in the order of first, third, fourth, and second cylinders 12. The associated cranks 17 are offset by 180° CA in the piston reciprocating order.

A magnetic crank rotor 21, which constitutes a crank position sensor 20, is fixed to the crankshaft 16. A semiconductor magnetic sensor 25 is arranged on the cylinder block 11 in the vicinity of the crankshaft 16 and opposed to the crank rotor 21. The magnetic sensor 25 includes semiconductor devices such as a Hall device and a magnetic resistance device. Teeth project from the periphery of the crank rotor 21 at an interval of 30° CA. One of the teeth are missing to form a gap.

A camshaft position sensor 30, which is an electromagnetic pick up, is provided in the cylinder head 13. A magnetic cam rotor 31 is fixed to the camshaft 19. One tooth projects from the periphery of the cam rotor 31. The camshaft position sensor 30 detects the tooth each time the cam rotor 31 rotates 360° (720° CA) and outputs a corresponding crankshaft position signal G.

The crankshaft position sensor 20 outputs a crank angle signal ne each time a teeth passes by the magnetic sensor 25. When the gap passes by the magnetic sensor 25, the crankshaft position sensor 20 outputs a reference position signal. The number of crank signals ne are counted. The crank angle corresponding to a certain cylinder is obtained from the crankshaft position signal G, the counted crank signals ne, and the reference position signal.

Thus, the two sensors 20, 30 allow the crank angle corresponding to a certain cylinder to be detected in engines having a multiple number of cylinders. This enables location of the cylinder that is to be ignited and location of the cylinder into which fuel is to be injected.

Accordingly, the crank angle (°CA) detected by the two sensors 20, 30 is used to control the timing of ignition or fuel injection, which are related to the strokes of the engine 10.

As shown in FIG. 1, an injector 50 is provided for each cylinder 12 in the cylinder head 13. Each injector 50 supplies the associated combustion chamber 15 with fuel at a predetermined crank angle.

The engine 10 is provided with an igniting mechanism that includes a pair of ignitors 27A, 27B. An ignition coil 28 and a spark plug 51 are provided for each cylinder.

The first and fourth cylinders constitute a first group while the second and third cylinders constitute a second group. The ignitor 27A corresponds to the first group while the ignitor 27B corresponds to the second group. The first and second ignitors 27A, 27B ignite each cylinder in the associated group. More specifically, based on ignition signals and cylinder selection signals sent from an electronic control unit (ECU 40), the ignitors 27A, 27B permit or break the flow of primary current to the primary coil of the associated ignition coil 28. When the flow of primary current to the first coil is broken, high secondary voltage is produced in the secondary coil of the ignition coil 28. The secondary voltage current jumps between the electrodes of the spark plug 24 and ignites the air-fuel mixture.

A coolant temperature sensor 23 is arranged in a coolant passage, which is provided in the engine 10, to detect the temperature of the coolant (coolant temperature THW). The temperature sensor 23 incorporates a thermistor which resistance value varies in accordance to changes in the coolant temperature.

An airflow meter is provided in an intake manifold of the engine 10 to detect the amount of air entering the engine 10.

The engine 10 is also provided with a starter (not shown) to crank the crankshaft 16 when starting the engine 10. The starter is provided with a starter switch 34 that detects the actuation of the starter. The starter is actuated by an ignition switch (not shown). When the ignition switch is manipulated, the starter is actuated and the starter switch 34 outputs a starter signal gwsta.

The ECU 40 control the ignition timing. The ECU 40 remains energized for a predetermined period of time after the engine 10 is stopped. Various control programs are stored in the ECU 40. A central processing unit (CPU) 42 executes computations based on the programs. A random access memory (RAM) 43 temporarily stores the computation results of the CPU 42 and various information from the sensors. A backup RAM 44 saves the information stored in the RAM 43 when the engine 10 is not running.

The CPU 42, the ROM 41, the RAM 43, and the backup RAM 44 are connected to one another by a bi-directional bus 45 and are connected to an input interface 46 and an output interface 47.

The input interface 46 is connected to the crankshaft position sensor 20, the coolant temperature sensor 23, the airflow meter 24, the camshaft position sensor 30, and the starter switch 34 among other sensors. Analog signals sent from the sensors are converted to digital signals by an analog to digital converter (not shown). The digital signals are sent to the bi-directional bus 45. The CPU 42 is connected to a battery voltage sensor (not shown), which detects the voltage B of battery installed in the automobile, by way of the input interface 46. The CPU 42 computes the engine speed ene based on the crank angle signals ne.

External circuits such as the output interface 47, the injectors 50, and the spark plugs 51 are connected to the output interface 47. These external circuits are actuated in accordance with the computations executed by the CPU 42.

The operation of the above ignition timing controller will now be described with reference to FIGS. 3 to 25.

In this embodiment, the ignition timing controller permits current flow in the present igniting cylinder and the subsequent cylinder that is to be ignited.

In the flowcharts described below, the following flags are used. These flags are set at ON or OFF (reset) when necessary.
(1) xspkast: after-starting ignition determination flag
(2) xespkigt: ne interruption ignition request flag
(3) xigtm: IGT (ignitor) ON monitor flag
(4) xihigton: after-starting IGT ON re-reservation prohibition flag
(5) xihigtof: after-starting IGT OFF re-reservation prohibition flag The main routine will first be described with reference to FIG. 20. The main routine is executed in a cyclic manner.

When entering the main routine, in step 1, the CPU 42 reads the battery voltage B and the crank angle signal ne. From these parameters, the CPU 42 refers to a map to obtain a current flow request time etigton. The obtained value is stored in a predetermined register. The CPU 42 then temporarily terminates this routine. The map is obtained through experiments and stored in the RAM 43.

The ignition timing control routine will now be described with reference to FIG. 3. The timing control routine determines the timing to commence or end the flow of current to the ignitors 27A, 27B. This routine is executed each time the crankshaft 16 is rotated by 30° CA, that is, each time the crank angle signal ne is output.

When entering this routine, in step 10, the CPU 42 determines whether the latch data eccrnk1 of the crank count eccrnk is equal to or greater than zero. The initial value of the crank counter eccrnk prior to cranking is set at a negative value.

Figure 22:
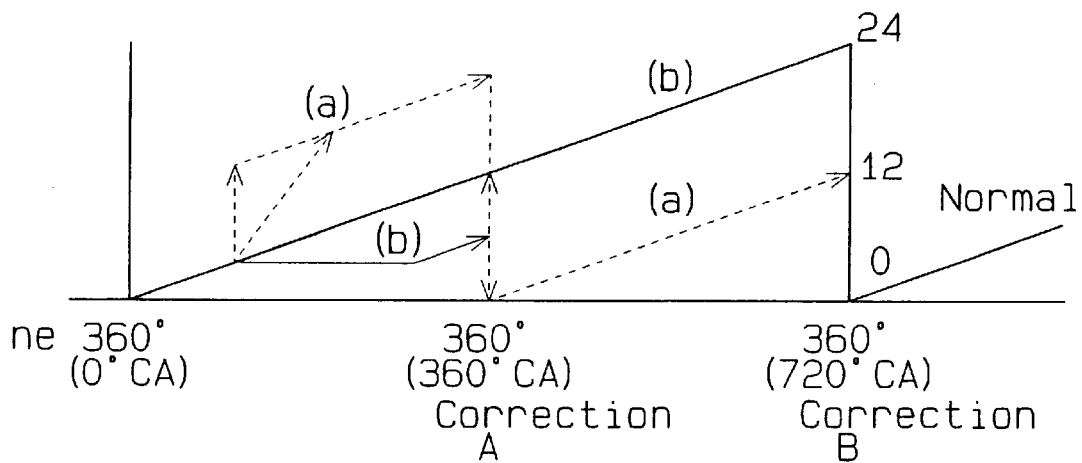
FIG. 22 is an explanatory diagram showing correction when eccrnk is erroneous.

The crank count eccrnk is shown by the solid line in FIG. 22. The CPU 42 continuously counts the crank angle signals ne, which are pulse waves sent from the crankshaft position sensor 20, and sequentially stores the values of 0 to 23 in the RAM 43 as latch data eccrnk. (Thus, the crank count eccrnk actually increases in a step-like manner but for the sake of brevity, the line is illustrated as an inclined line in FIG. 22.) If the crank count eccrnk exceeds the value of 12 at a timing corresponding to 360° CA, the crank count eccrnk is reset at 0 (or initiated). If the crank count eccrnk is equal to or smaller than the value of 12 at a timing corresponding to 360° CA, the crank count eccrnk is set at 12. In this manner, the crank counter eecrnk is corrected at the timing corresponding to the top dead center (TDC). Furthermore, when the crankshaft position signal G is output, the count value of the crank count eccrnk is reset at zero.

When the crank count eccrnk is smaller than 0, that is, when the crank angle signal ne has not been received, the CPU 42 temporarily terminates this routine.

If the latch data eccrnk1 of the crank counter is equal to or greater than zero in step 10, the CPU 42 proceeds to step 20 to execute the erroneous crank count eccrnk processing routine, which will be described later.

The CPU 42 then proceeds to step 30 to determine the igniting cylinder espki and the subsequent igniting cylinder espkinxt. The routine for determining the igniting cylinder will be described later.

After determining the igniting cylinder in step 30, the cPu 42 proceeds to step 40. In step 40, if the deviation angle ecatd from the TDC of the igniting cylinder has reached a count value corresponding to 90° CA before the top dead center (BTDC 90° CA), the CPU 42 permits reservation of the IGT OFF timing. In other words, the CPU 42 resets the IGT OFF re-confirmation prohibiting flag xihigtof of the igniting flag espki at OFF. The deviation angle ecatd from the top dead center (TDC) of the igniting cylinder is computed in step 30.

In step 50, the CPU 42 determines whether the engine starting ignition mode is being carried out. In other words, if the after-starting ignition flag xspkast is set at OFF, the CPU 42 determines that the starting ignition mode is being carried out. If the after-starting ignition flag xepkast is set at ON, the CPU 42 determines that the starting ignition mode is not being carried out. The after-starting ignition flag xspkast is altered to change the mode if IGT OFF interruption takes place, if the engine stalls, or if the engine speed decreases suddenly while reserving the timing to commence current flow after starting of the engine.

When in the engine starting ignition mode, the CPU 42 proceeds to step 60 and determines whether or not the igniting cylinder espki located in step 30 is waiting after-starting ignition. If it is determined that after-ignition is not being carried out, the CPU 42 temporarily terminates subsequent processing.

If it is determined that the cylinder is waiting after-starting ignition, the CPU 42 proceeds to step 70. At step 70, the CPU 42 executes the engine starting fixed ignition routine, which will be described later.

After executing the engine starting fixed ignition routine, the CPU 42 proceeds to step 90 and permits current flow commencement in the subsequent igniting cylinder espkinxt. In other words, the after-starting IGT ON re-reservation prohibition flag xihigton of the subsequent igniting cylinder espkinxt is reset to OFF by the CPU 42.

After step 90, the CPU 42 temporarily terminates subsequent processing. If it is determined that the starting ignition mode is not being carried out in step 50, the CPU 42 proceeds to step 100.

At stop 100, tho CPU 42 latches the time length required for 30° CA. The latch data et3xon is used so that the time for 30° CA is the same in the current flow commencement timing reservation and the current flow breakage timing reservation, which will be described later. The time required for 30° CA is computed from the deviation angle ecatdc of the TDC of the cylinder located in step 30. Thus, the time of 30° CA corresponds to the time required 30° CA immediately before the cylinder TDC.

At step 110, the CPU 42 determines whether the current flow commencement time reservation has boon permitted. This is determined by judging whether the after-starting IGT ON re-reservation prohibition flag xihigton of the igniting cylinder espki has been reset to OFF. If the flag xihigton is not reset at OFF, the CPU 42 proceeds to step 120.

At step 120, the CPU 42 executes the current flow commencement timing reservation of the igniting cylinder espki.

The CPU 42 then proceeds to step 130 and determines whether there was no change in the ignition mode when reserving the commencement timing. This is determined by judging whether or not the after-starting ignition flag xspkast is set at ON. It there is a change in the ignition mode, that is, if the ignition flag xspkast is rest at OFF, the CPU 42 temporarily terminates subsequent processing.

On the other hand, if the ignition flag xspkast is set at ON, the CPU 42 proceeds to step 140. At step 140, the CPU 42 determines whether the current flow breakage timing reservation has been permitted. This is determined by judging whether the after-starting IGT OFF re-reservation flag xihigtof has boon rosot at OFF. If the flag xihigtof is set at ON, the CPU 42 jumps to step 160. If the flag xihigtof is reset at OFF, the CPU 42 proceeds to step 150.

At step 150, the CPU 42 makes the current flow breakage timing reservation, which will be described later. After step 150, the CPU 160 proceeds to step 160 and manipulates the IGT ON commencement timing of the subsequent cylinder espkinxt.

More specifically, the CPU 42 permits the reservation commencement timing of the IGT ON when the deviation angle ecatdc from the TDC of the igniting cylinder reaches the count value corresponding to the subsequent cylinder reservation timing (which is BTDC 240° CA in this cylinder since a four-cylinder type engine is used. For six-cylinder type engines, this would be BTDC 180° CA). In other words, to make the subsequent cylinder current flow commencement reservation at the timing corresponding to the above count value, the CPU 42 resets the after-starting IGT ON re-reservation prohibition flag xihigton of the igniting cylinder espki obtained in step 30 at OFF.

At step 170, the CPU 42 determines whether or not the conditions for permitting current flow commencement time of the subsequent cylinder are satisfied. There are two conditions as described below.

(1) The after-starting IGT ON re-reservation prohibition flag xihigton of the subsequent cylinder is set at OFF.

(2) The angle between the TDC of the igniting cylinder eepki and the present angle (count valuq) is two or smaller (60° CA or smaller).

The two conditions are for permitting reservation of the current flow commencement timing of the subsequent igniting cylinder espkinxt immediately after starting the engine from BTDC 240° CA.

When any one of the two conditions are not satisfied in step 170, the CPU 42 temporarily terminates subsequent processing.

If both conditions are satisfied in step 170, the CPU 42 proceeds to step 180 and performs the current flow commencement timing reservation, which will be described later. After carrying out step 180, the CPU 42 temporarily terminates subsequent processing. The execution of step 180 enables overlapped current flow in the present igniting cylinder and the subsequent igniting cylinder.

The erroneous crank counter eecrnk processing routine of step 20 will now be described with reference to FIGS. 11 to 13.

Figure 11:
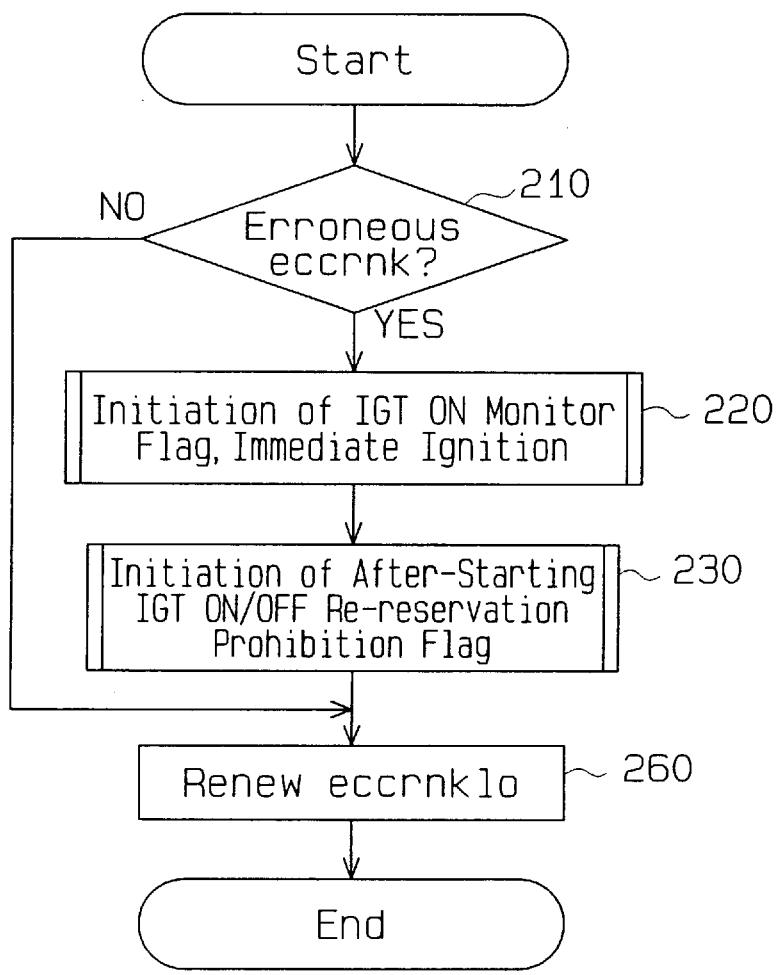
FIG. 11 is a flowchart showing a routine for processing erroneous crank counter eccrnk.

FIG. 11 illustrates the erroneous crank counter eecrnk processing routine. This routine is executed in an interrupting manner when the CPU 42 carries out step 20. When entering this routine, the CPU 42 first carries out step 210 and determines whether or not conditions indicating erroneous crank count eccrnk are satisfied. This is judged by the following two conditions. If it is determined that the crank count eccrnk is not erroneous, the CPU 42 jumps to step 260.

(1) The latch data of the crank count eccrnk in the present ne interruption is eccrnk1 =12, and the latch data eccrnk10 of the previous ne interruption is 10≠11.

(2) The latch data of the crank count eccrnk in the present ne interruption is eccrnk1 =0, and the latch data eccrnk10 of the previous ne interruption is 10≠23.

As shown in FIG. 22, the crank count eccrnk is corrected or reset (initialized) each time tho crank count eccrnk roaches 360° CA or each time the crankshaft position signal G is reset.

In FIG. 22, the dotted line denoted as (a) indicates changes in the crank count eccrnk when the crank angle signal ne is frequently output or when noises effect the crankshaft position signal G. In this case, the value of the crank count eccrnk becomes greater than that under normal states. At point A corresponding to 360° CA, the value of the crank count eccrnk during the previous ne interruption is 23. Thus, the value of the crank count eccrnk in the present ne interruption is reset to zero. In this case, the erroneous crank count eccrnk cannot be detected. However, at point B corresponding to 720° CA, the crank count eccrnk is initialized if the crankshaft position signal G is received.

In FIG. 22, the line denoted as (b) indicates changes in the crank count eccrnk when there is a missing crank angle signal ne. In this case, the value of the crank count eccrnk is smaller than that under normal states. At point A corresponding to 360° CA, the value of the crank count eccrnk in the previous ne interruption is twelve or smaller. Hence, in the present ne interruption, the crank count eccrnk is corrected to twelve. In this case, erroneous crank count eccrnk is detected. This satisfies condition (1) and the CPU 42 determines that the crank count eccrnk is erroneous in step 210.

If it is determined that the crank count eccrnk is erroneous in step 210, the CPU 42 proceeds to step 220. At step 220, the CPU 42 initializes the IGT ON monitor flag and executes immediate ignition. The contents of stop 220 is illustrated in detail in FIG. 12.

With reference to FIG. 12, interruption is prohibited in step 221. The following processing of the ignitors 27A, 27B is executed in step 222.

(1) Initialization of the IGT ON monitor flag xigtm.
(2) Initialization of the ne interruption ignition request flag xspigt.
(3) Selection of the I/O function for each cylinder.
(4) Immediate ignition.

The IGT ON monitor flag xigtm and the ne interruption ignition request flag xspigt correspond to the ignitors 27A, 27B.

The selection of the I/O function in each cylinder is carried out by selecting an address of the I/O output port based on a timed output I/O function address table to perform immediate ignition. When performing immediate ignition, the reservation is cancelled to break the flow of current in the ignitor 27A, 27B corresponding to the selected address.

In step 222, if the crank count eccrnk is corrected in an ignition ON state or after making the ON reservation, immediate ignition is executed at the TDC timing so that the subsequent cylinder may be started from an IGT ON state.

When completing step 222, the CPU 42 proceeds to step 223 and permits interruption. This routine is terminated afterwards. The CPU 42 then proceeds to step 230 illustrated in FIG. 11.

At step 230, the CPU 42 initializes the after-starting IGT ON/OFF re-reservation prohibition flag to prepare for ignition in the subsequent cylinder.

The contents of step 230 is illustrated in detail in FIG. 13. At step 231, the after-starting IGT ON re-reservation prohibition flag xihighton corresponding to one of the ignitors 27A, 27B is set at OFF while the after-starting IGT ON re-reservation prohibition flag xihighton corresponding to the other ignitor 27A, 27B is set at ON by the CPU 42. Furthermore, the after-starting IGT OFF re-reservation prohibition flag xihightoff corresponding to one of the ignitors 27A, 27B is set at ON while the after-starting IGT OFF re-reservation prohibition flag xihightoff corresponding to the other ignitor 27A, 27B is set at ON by the CPU 42.

If there are six cylinders with an ignitor provided for each pair of cylinders, three ignitors are necessary. In this case, the after-starting IGT ON re-reservation prohibition flag xihighton corresponding to one of the ignitors is set at OFF while the after-starting IGT ON re-reservation prohibition flag xihighton corresponding to the other two ignitors is set at ON by the CPU 42. Furthermore, the after-starting IGT OFF re-reservation prohibition flag xihightoff corresponding to one of the ignitors is set at ON while the after-starting IGT OFF re-reservation prohibition flag xihightoff corresponding to the other two ignitors is set at ON by the CPU 42.

Afterwards, the CPU 42 returns to the flowchart of FIG. 11 and proceeds to step 260.

When the CPU 42 proceeds to step 260 from either steps 210 or step 230, the CPU 42 stores (renews) the crank counter latch data eccrnk1 as the previous latch data eccrnk10. The CPU 42 then terminates subsequent processing.

Figure 19:
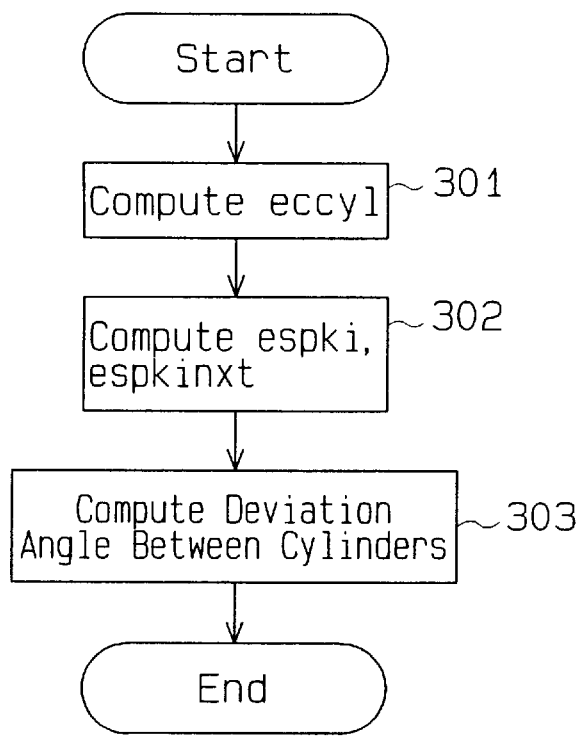
FIG. 19 is a flowchart showing a routine for determining the igniting cylinder.
Figure 20:
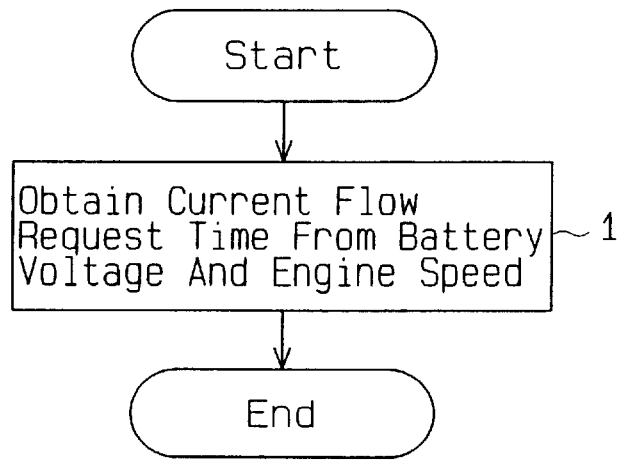
FIG. 20 is a flowchart showing a main routine of the first embodiment.

The determination of the igniting cylinder in step 30 of the ignition timing control routine will now be described with reference to the flowchart of FIG. 19.

At step 301, the CPU 42 obtains the earcyl computed cylinder identification code eccyl from the crank counter. The computation is carried out through the following equation.

$$eccyl = ((eccrnk + ENEIRP - 1)/ENEIRP)\%ENCYL$$

In the equation, ENEIRP represents the number of ne interruptions between the TDC of cylinders. In this case, since there are four cylinders, ENEIRP represents the value of six. If there are six cylinders, ENEIRP represents the value of four. ENCYL represents the number of cylinders, which is four in this embodiment. Furthermore, % represents a remainder computation operator and is used to compute the remainder of integers (including zero). Accordingly, in this equation, the computed eccyl is an integer (including zero). For example, if there are four cylinders and the eccrnk1 is 13, the eccyl is three.

The CPU 42 then proceeds to step 302 and computes the identification index espki of the igniting cylinder and the identification index espkinxt of the subsequent cylinder espki from the following equations $$espki = eccyl\%ENIGT \tag{1}$$

$$espkinxt = (espki+1)\%ENIGT \tag{2}$$

In the above equations, ENIGT represents the number of IGT outputs. In this embodiment, since there are four cylinders, ENIGT represents the value of two.

As shown in FIG. 25, in step 302, the espki value between the ATDC (after top dead center) 30° CA of the previously ignited cylinder and the TDC of the presently igniting cylinder remains the same. This controls the ignitor used during this period.

From the equation (1). the allocation of the espki with respect to the line of igniting cylinders in an in-line four cylinder engine is as shown in the following table 1.

TABLE 1

| | | Igniting Cylinder | | | | | |
|---|---|---|---|---|---|---|---|
| ENIGHT | | #1 | #2 | #3 | #4 | #5 | #6 |
| 2 | L4 | 0 | 1 | 1 | 0 | — | — |
| 3 | V6 | 0 | 1 | 2 | 0 | 1 | 2 |
| 3 | L6 | 0 | 1 | 2 | 2 | 1 | 0 |

In table 1, L4 represents an in-line four cylinder engine, L6 represents an in-line six cylinder engine, and V6 represents a V-type six cylinder engine.

After carrying out step 302, the CPU 42 proceeds to step 303. In step 303, the CPU 42 computes the deviation angle ecatdc between the TDC of subsequent cylinders from the crank count (latch data) eccrnk1 of the present Ne interruption and the number of ne interruptions ENEIRP between the TDC of subsequent cylinders. The computation is performed through the following equation.

$$ecatdc = eccrnk1\ \%ENEIRP$$

In the equation, ecatdc is a count value and represents eviation angle between subsequent cylinders. One count sponds to 30° CA. FIG. 25 shows an example obtained gh the equation. After completing step 30, the CPU nates subsequent processing.

The engine starting fixed ignition routine executed in 70 will now be described with reference to FIG. 14.

When entering the engine starting fixed ignition routine, the CPU 42 first prohibits interruption in step 701 and then proceeds to step 702. In step 702, the following processings are carried out.

(1) Selection of I/O function for each cylinder.
(2) Does the timing correspond to BTDC 30° CA?
(3) Commence current flow immediately.

In process (1), the selection of I/O function refers to the allocation of I/O functions for each cylinder using the timed output I/O function address table, which is based on the igniting cylinder espki located in step 30. The timed output I/O function address table is stored in the ROM 41.

In processes (2) and (3), current flow is immediately commenced if the deviation angle from the TDC of the igniting cylinder corresponds to the count value of BTDC 30° CA. (Since there are four cylinders in this embodiment, the count value is five. If a six cylinder engine is used, the count value is three.)

The CPU 42 then proceeds to step 703 and determines whether the following conditions are satisfied.

(1) Timing corresponding to TDC.

(2) The ne interruption is not used for determination of eccrnk.

In condition (1), the CPU 42 confirms whether or not the deviation from the TDC of the igniting cylinder corresponds to the TDC timing value. In other words, it is confirmed whether the count value corresponding to TDC is zero.

In condition (2), the CPU 42 determines whether the IGT ON monitor flag xigtm is set at ON. The crank count eccrnk is determined in correspondence with the TDC. This condition is necessary to prevent sudden ignition.

If conditions (1) and (2) are both satisfied, that is, if the timing corresponds to the TDC and the IGT ON monitor flag xigtm is set at ON, the CPU 42 proceeds to step 704.

At step 704, if the coolant temperature THW is equal to or lower than a predetermined temperature A (in this embodiment, 95° C.), the CPU 42 breaks the current flow in the ignitor of the igniting cylinder to perform immediate ignition. Accordingly, current flow is commenced at BTDC 30° CA in step 702 and broken at the TDC in step 704.

Furthermore, at step 704, if the coolant temperature THW is higher than the predetermined temperature, this indicates that the cylinder 12 is too hot and that the flames In the cylinder 12 are excessively diffused. In such case, knocking may occur. To prevent knocking, the ignition timing is retarded. The amount of retarding is computed from the following equation.

Ignition retarding amount=ezne301+EARTD*et3x

In the equation, ezne301 represents the latch data corresponding to the 30° CA interruption timing, et3x represents the time required for 30° CA, and EARTD represents a constant.

After completing step 704, the CPU 42 proceeds to step 706 and permits interruption. The CPU 42 then terminates subsequent processing.

The current flow commencement timing reservation routine executed in steps 120 and 180 will now be described with reference to FIG. 15. The current flow commencement timing reservation is a sub-routine that is executed when the CPU 42 enters steps 120 and 180.

When entering the routine, the CPU 42 computes the ignition angle t_aop in step 1210. The computation is performed by executing the ignition angle computation routine, which will be described later.

The CPU 42 then proceeds to step 1230 and latches the ignition angle t_aop obtained in step 1210 to prevent advancing when making current flow breakage reservations. The CPU 42 then proceeds to step 1240 and reflects the dwell angle (angle converting angle of continuous current flow time). The dwell angle is computed from the following equation.

t_aop (dwell angle)=t_aop+etigton*EA30IGT/et3xon

In the equation, etigton represents the required current flow time (which is obtained in the main routine illustrated in FIG. 20), EA30IGT represents a constant for converting time to angle, and et3xon represents the time required for 30° CA. From the equation, tho CPU 42 computes the continuous current flow time for the 30° CA time that is closest to the present time.

At step 1250, the CPU 42 computes the timing for commencement of current flow. To compute current flow commencement timing, the CPU 18 executes the exacter (current flow commencement timing or current flow breakage timing) and earstca (the remaining angle from the immediate ne interruption to the TDC) computation routine, which will be described later.

At step 1260, the CPU 42 determines whether or not the current flow commencement timing exacter obtained in step 1250 corresponds to the ne interruption timing. In other words, the CPU 42 determines whether or not the current flow commencement timing exacter is smaller than 30° CA. Step 1260 is carried out for reservation of current flow at the immediate ne interruption.

In step 1260, if the current flow commencement timing is smaller than 30° CA, the CPU 42 proceeds to step 1270. If the current flow commencement timing is equal to or greater than 30° CA, the CPU 42 terminates subsequent processing.

Figure 9:
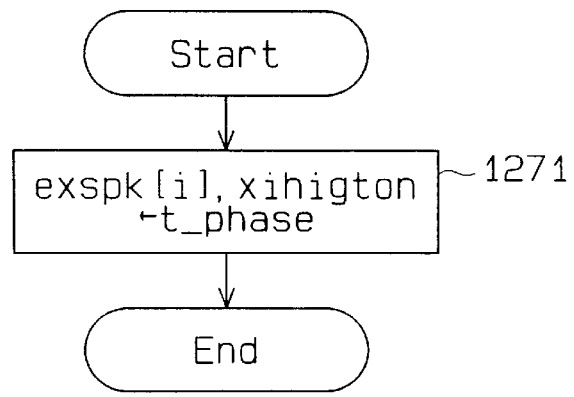
FIG. 9 is a flowchart showing a routine for manipulating xihigton.

At step 1270, the CPU 42 prohibits reservation of the current flow commencement time until tho noxt cyclo. Stop 1270 is carried out to prevent continuous current flow in the same cylinder. In this step, the xihigton manipulation routine of FIG. 9 is executed.

When entering the routine, the CPU 42 carries out the following processing in step 1271.

exspk[i].xihigton←t_phase

In the above, the number allocated to the ignitor is represented by i. Furthermore, t_phase represents flag writing ON/OFF data.

When carrying out step 1270, i corresponds to the number of the subject ignitor and t_phase is set at ON. In other words, the after-starting IGT ON re-reservation prohibition flag xihigton of the employed ignitor is set at ON.

At stop 1280, the current flow commencement timing t_zcprigt is computed from the following equation.

t_zcprigt=ezne301+earstca*et3xon/EA30T0T−EESPKLAG

In the equation, ezne301 represents the latch data corresponding to the 30° CA tilming, earstca represents the remaining angle from the immediate ne interruption to the TDC, EA30T0T represents a constant for converting angle to time using et3xon, and et3xon represents the latch data of the time required for 30° CA. Furthermore, EESPKLAG represents a constant for retarding ignition in the hardware.

Aftor step 1280, the CPU 42 proceeds to step 1300 and determines whether or not the following two conditions are satisfied.

(1) Shifting to the starting ignition mode is possible (before BTDC 30° CA)

(2) There is a sudden decrease in engine speed.

In condition (1), shifting to the starting ignition mode is possible when the angle eccrnka between the present position and the TDC of the igniting cylinder exceeds one count. In this embodiment, one count corresponds to 30° CA.

When condition (1) and condition (2) are both satisfied, the CPU 42 proceeds to step 1400. If any one of these conditions are not satisfied, the CPU 42 proceeds to step 1500.

Figure 8:
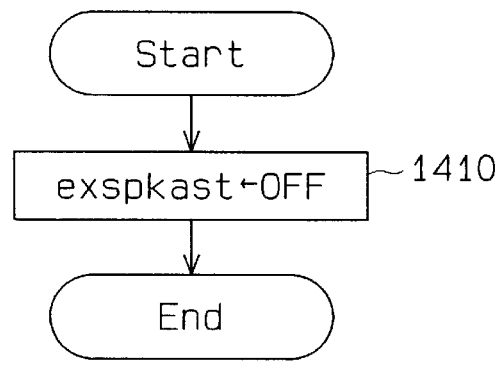
FIG. 8 is a flowchart showing a routine for shifting starting ignition mode.

At step 1400, the CPU 42 executos the after-starting ignition mode shifting routine of FIG. 8. When entering the routine, the CPU 42 resets the after-starting ignition recognition flag exspkast at OFF in step 1410. Afterwards, the CPU 42 completes step 1400 and terminates subsequent processing.

Figure 5:
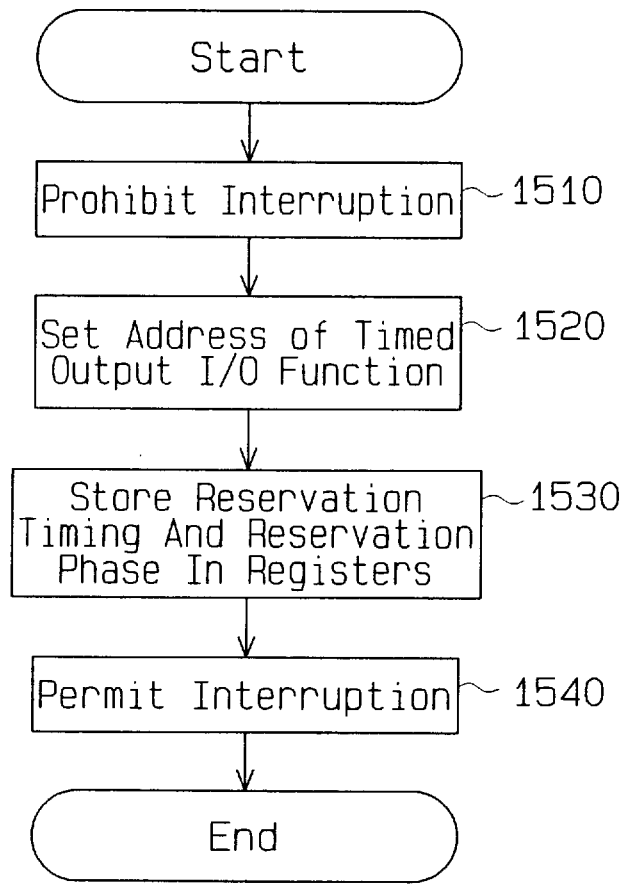
FIG. 5 is a flowchart showing a routine for setting the current flow timing.

In step 1300, if the conditions are not satisfied, the CPU 42 proceeds to step 1500 and sets the current flow commencement timing. The current flow timing setting routine, which is illustrated in FIG. 5, is executed in step 1500.

The current flow timing setting routine, which is a subroutine executed in step 1500, will now be described with reference to FIG. 5.

When entering the routine, the CPU 42 prohibits interruption in step 1510. At step 1520, the CPU 42 sets the address of the timed output I/O function corresponding to the allocated number of the employed ignitor. At step 1530, the CPU 42 stores the reservation time t_tim and the reservation phase t_phase of the ignitor port in the register of the corresponding timer.

Accordingly, in this routine, the CPU 42 selects the timer measuring register of the timed I/O function of the subject cylinder. The CPU 42 then stores the reservation time t_tim and the selected phase t_phase (ON if current flows and OFF if current flow is broken) in the selected register.

Since this routine is executed In step 1500 to set the current flow commencement time, the reservation time t_tim is the current flow commencement time t_zcprigt and the reservation phase t_phase is ON. These values are stored in the register of the corresponding timer. The timer measures time based on the reservation time t_tim stored in the register. When the time comes, a signal is set to the ignitor port in accordance with the selected phase t_phase (ON if current flows and OFF if current flow is broken).

At step 1540, the CPU 42 permits interruption and terminates the current flow timing setting routine.

Figure 15:
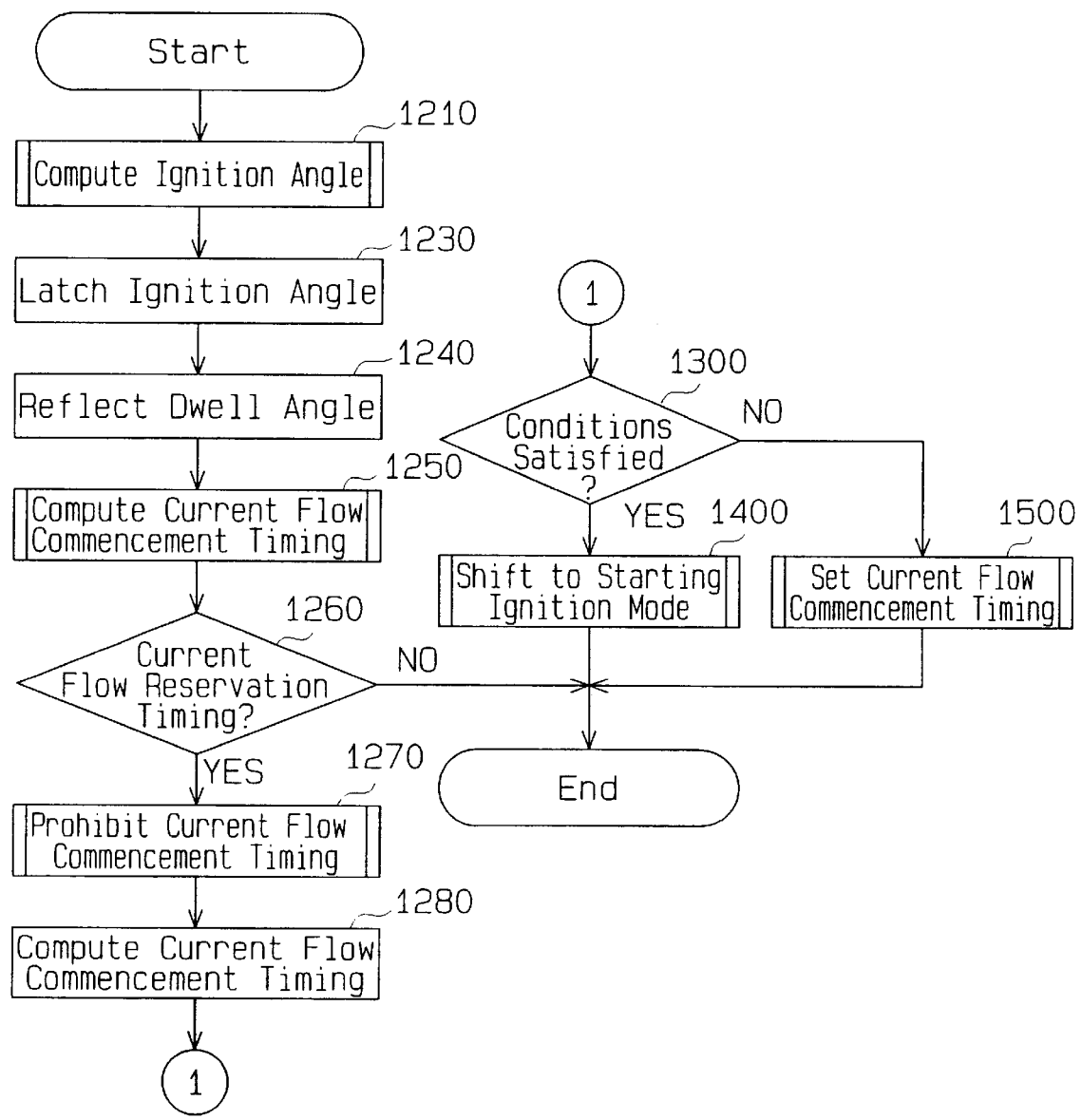
FIG. 15 is a flowchart showing a routine for reservation of current flow commencement timing.
Figure 17:
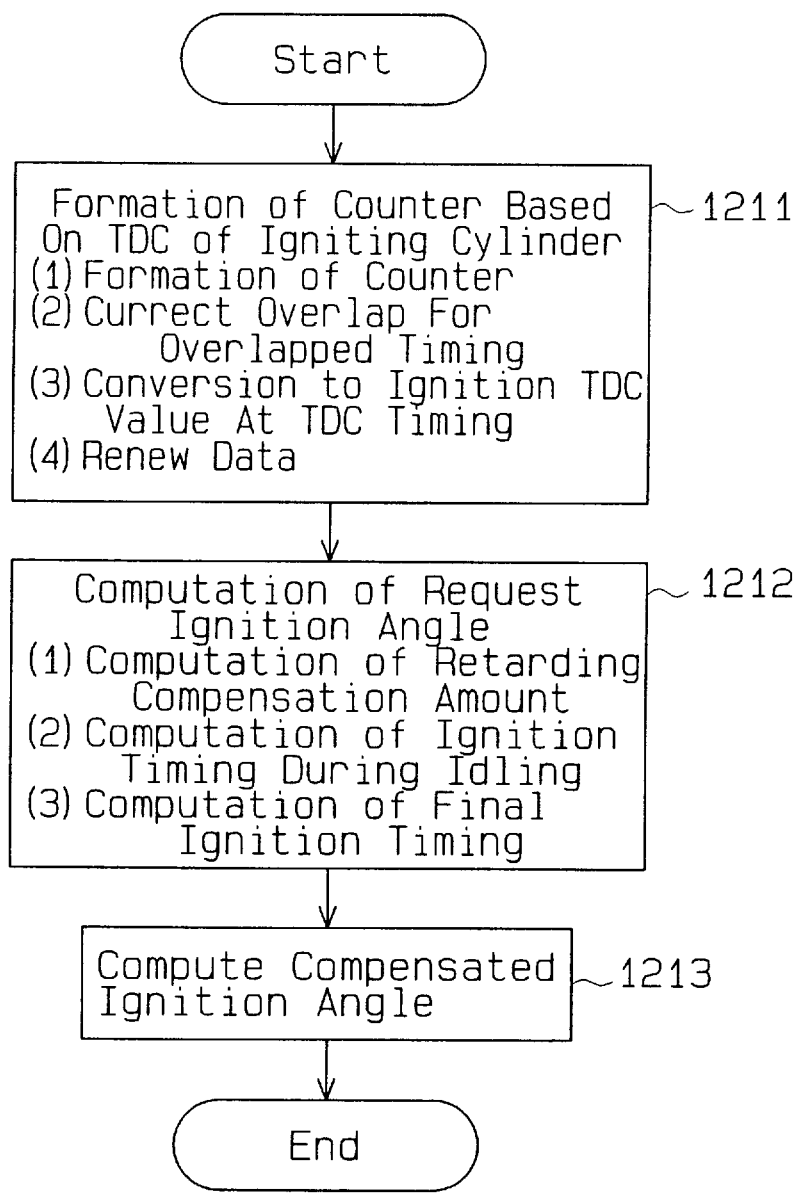
FIG. 17 is a flowchart showing a sub-routine for computing ignition angle.

The ignition angle computation routine executed in step 1210, which is illustrated in FIG. 15, will now be described with reference to FIG. 17.

When entering this routine, in step 1211, the CPU 42 forms the counter t_ccrnka, which is based on the TDC of the igniting cylinder. In other words, the following processes are carried out in step 1211.

(1) Formation of counter.

(2) Correction of overlap during overlapped timing.

(3) Conversion to ignition TDC value when at TDC timing.

(4) Data renewal.

The counter t_ccrnka is obtained from the following equation.

$$t\_ccrnka = ENEIRP - ecatdc$$

From the equation, the angle between the present position and the TDC is obtained. In the equation, ENEIRP represents the number of ne interruptions between the TDC of subsequent cylinders. In a four cylinder type engine, the phase between the TDC of subsequent cylinders is 180° CA. Since the ne interruption takes place for every 30° CA, the number of ne interruptions between the TDC of subsequent cylinders is six. In a six cylinder type engine, the phase between the TDC of subsequent cylinders is 120° CA. Since the ne interruption takes place for every 30° CA, the number of ne interruptions between the TDC of subsequent cylinders is four. With regard to the equation, ecatdc represents the deviation angle from the TDC of the igniting cylinder.

In the above process (2), overlapped timing refers to a state in which the identification code t_idx of the cylinder that is to undergo current flow does not correspond to the igniting cylinder espki (t_idx≠espki) and the deviation angle ecatdc from the igniting TDC is not zero (ecatdc≠0).

When these conditions are satisfied, the CPU 42 determines that there is overlapping. In this case, the CPU 42 computes t_ccrnka+ENEIRP. The t_ccrnka is renewed by the obtained value.

In the above process (3), at the TDC timing, the identification code t_idx of the cylinder that is to undergo current flow corresponds to the igniting cylinder espki (t_idx= espki), and the deviation angle ecatdc from the igniting TDC is zero (ecatdc=0).

After computing the counter t_ccrnka through processes (1), (2), and (3), data is renewed in process (4). In other words, the value of the t_ccrnka obtained in the above manner is input in the register for the angle eccrnka from the present ne interruption to ignition that corresponds to the identification code t_idx of the cylinder, which is to undergo current flow.

FIG. 23 illustrates the relationship between the TDC and the BTDC with respect to the eccrnka. As shown in the diagram, when there are four cylinders, eccrnka takes the values of zero to eight between TDC and BTDC 240° CA. When there are six cylinders, eccrnka takes the values of zero to six between TDC and BTDC 180° CA.

At step 1212, the CPU 42 computes the request ignition angle. More specifically, the following computations (1) to (3) are carried out.

(1) Computation of retarding compensation amount.

In this computation, the retarding compensation amount for each cylinder is computed. When knocking takes place during ignition or if knocking tends to take place in any one of the cylinders, this information is stored. When the igniting cylinder is the cylinder that tends to knock, the retarding compensation amount of the igniting cylinder is obtained through a map (not shown).

(2) Computation of ignition timing during idling.

(3) Computation of final ignition timing eaop.

The CPU 42 then proceeds to step 1213 and computes the compensated ignition angle. This enables software to compensate for the late ignition caused by hardware and advances the ignition timing. More specifically, the following computation is executed.

$$(eaop-EAHRD)*EAOP$$

In the above equation, EAHRD represents the crank count eccrnk and the actual offset angle. EAOP represents a conversion co-efficient.

The CPU 42 terminates the ignition angle computation routine when completing step 1213.

The eacntcr (current flow commencement timing or current flow breakage timing) and earstca (the remaining angle from the immediate ne interruption to the TDC) computation routine executed in step 1250, which is illustrated in FIG. 15, will now be described with reference to FIG. 18.

When entering this routine, at step 1251, the CPU 42 computes the angle t_actos between the present ne interruption and the current flow commencement (or current flow breakage) from the following equation.

$$t\_actos = eccrnka[t\_idx] - (t\_aop - EMPUADV)$$

In the equation, eccrnka[t_idx] represents the angle (count value) between the identification code t_idx of the cylinder that is to undergo current flow and the TDC (count value). Furthermore, t_aop represents the igniting angle and EMPUADV represents a constant.

At step 1252, the CPU 42 computes the deviation angle t_arstca between the ne interruption, which comes immediately before current flow commencement (or current flow breakage), and the current flow commencement (or current flow breakage). In other words, the lower byte of the angle t_arstca obtained in step 1251 is set as angle t_actos.

At step 1253, the CPU 42 processes the lower limit guard of the angle t_arstca between the ne interruption and current flow commencement (or current flow breakage). More specifically, the processes described below are carried out.

(1) Lower limit guard value t_esagd computation

Lower limit guard value t_esagd is computed from the following equation:

$$t\_esagd = ene * EKESAGD$$

In the above equation, EKESAGD is a constant for converting allowance time to angle to obtain the lower limit guard value, and ene represents the engine speed.

(2) 30° CA advancing

In this step, if there is not enough tine between the ne interruption immediately before current flow (or current breakage) and the timing of actual current flow (or current flow breakage), the following processes are carried out.

(a) If there is more than 30° CA until current flow commencement (or breakage), that is, if t_actos obtained in step 1251 satisfies the condition of t_actos≧30° CA, the following computations are further carried out using t_actos and t_arstca:

$$t\_actos = t\_actos - 30(°CA)$$

$$t\_arstca = t\_arstca + 30(°CA)$$

(b) When there is no more than 30° CA, that is, if the condition of t_actos<30° CA is satisfied, t_actos and t_aretca are replaced in the following manner:

$$t\_actos = 0(°CA)$$

$$t\_arstca = t\_esagd \text{ (lower limit guard value)}$$

This process is executed when fluctuation in engine speed causes the lower limit guard value t_esagd computed in the previous no interruption to be smaller than the lower limit guard value t_esagd computed in the present ne interruption and thus causes time to be insufficient.

At step 1254, the CPU 42 stores the computed t_actos in the register of the current flow commencement (or current flow breakage) timing exacter and stores t_arstca in the register of the remaining angle earstca.

After completing step 1254, the CPU 42 terminates this routine. The relationship between exacter and earstca is illustrated in FIG. 24, which shows an example of when current flow is broken. In this example, exacter and earstca are computed at the ne interruption of BTDC90° CA.

Figure 3:
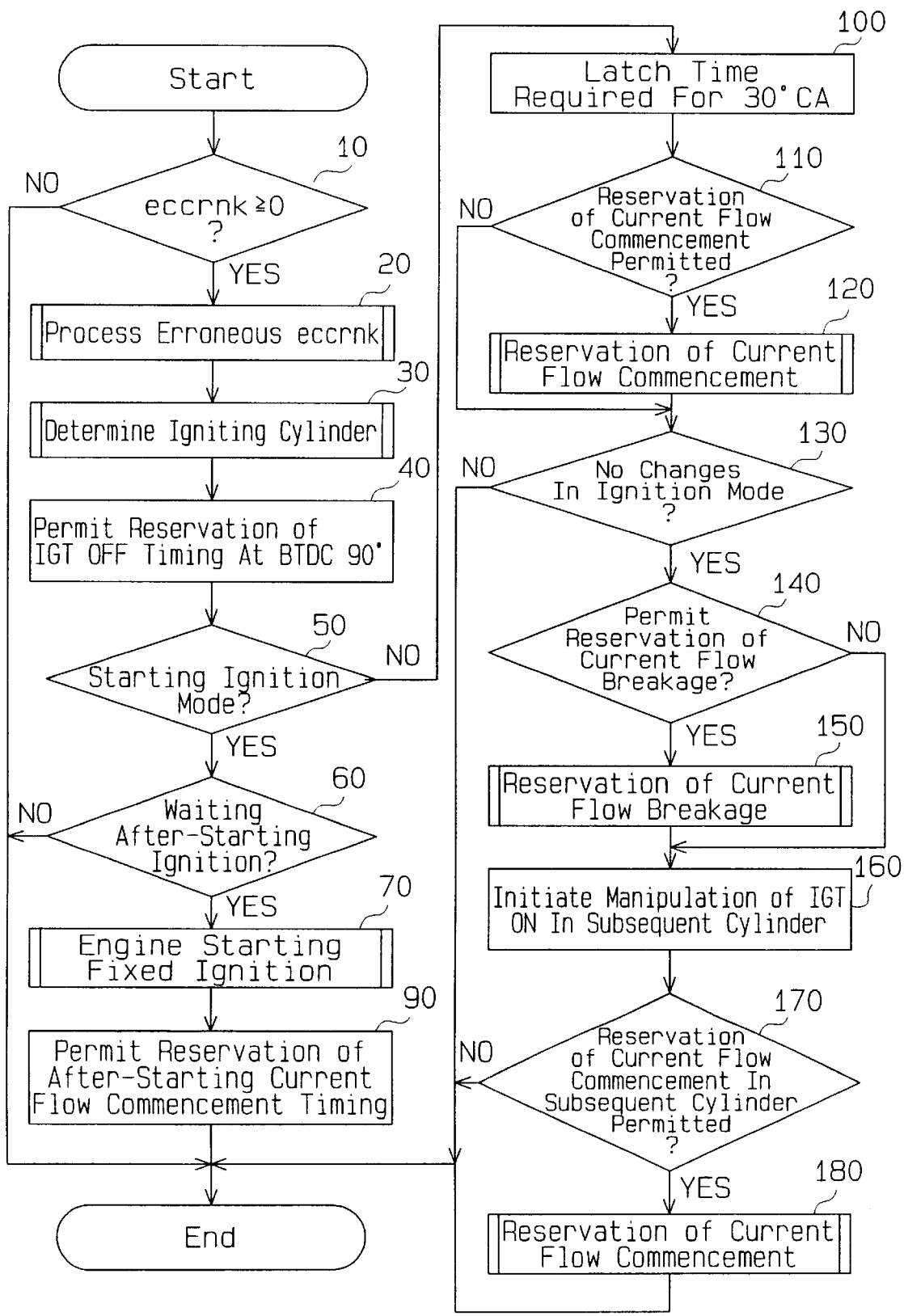
FIG. 3 is a flowchart showing a routine for controlling ignition timing.

The current flow breakage time reservation executed in step 150, which is illustrated in FIG. 3, will now be described with reference to FIG. 16.

Figure 16:
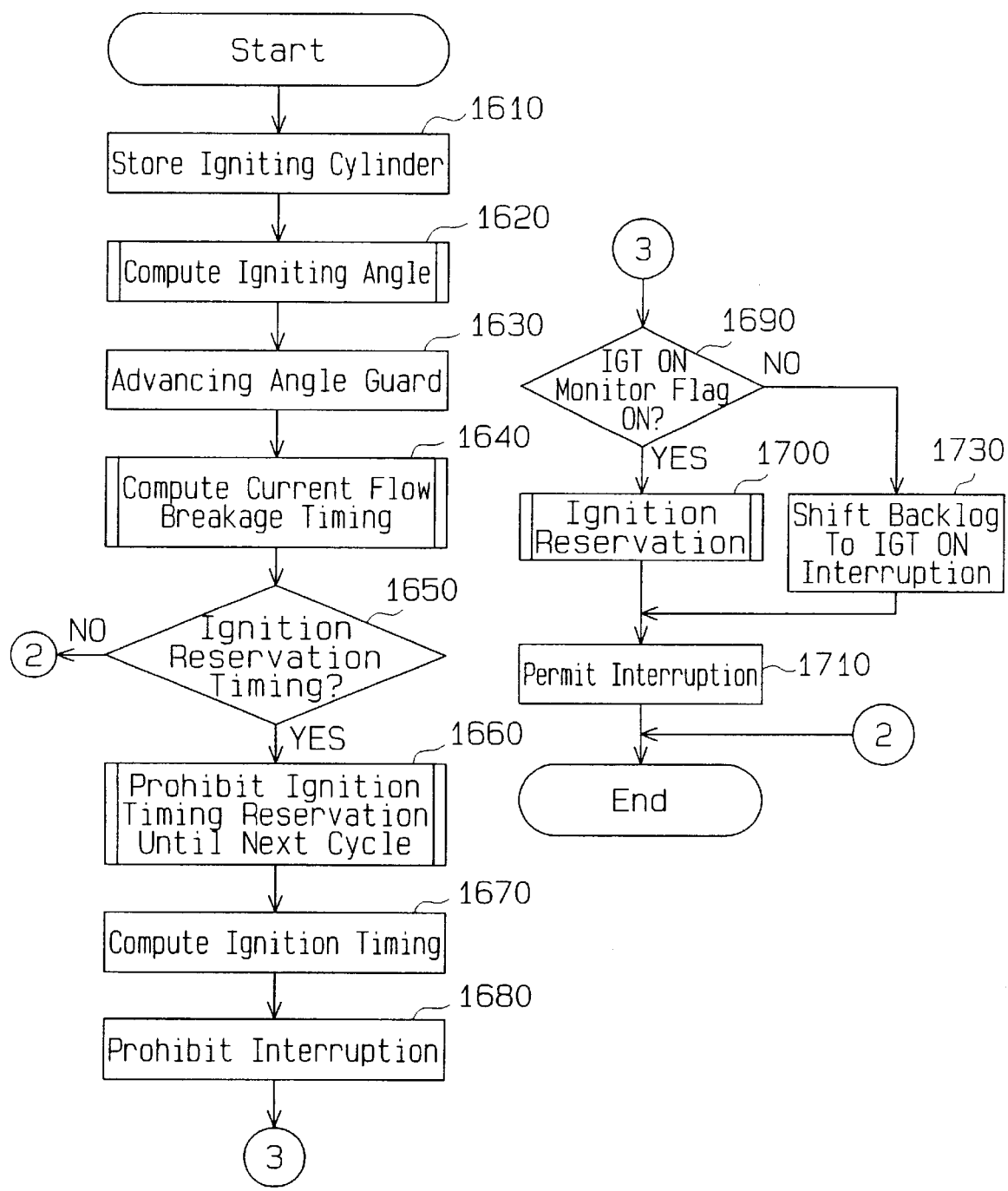
FIG. 16 is a flowchart showing a routine for reservation of current flow breakage timing.

The flowchart of FIG. 16 shows the current flow breakage timing reservation routine. When entering this routine, at step 1610, the CPU 42 stores the allocation code of the igniting cylinder espki in the register of the designated IGT allocation number. At step 1620, the CPU 42 computes the ignition angle t_aop by executing the ignition angle computation routine, which is illustrated in FIG. 17.

At step 1630, the CPU 42 carries out advancing guard processing through the following processes.

(1) Store guard value

The CPU 42 reads a predetermined guard value eopon from the ROM 41 and stores the value in the register t_aopon of the RAM 43.

(2) If the register t_aop is at the advancing side of the ignition angle t_aop during reservation of current flow commencement, the CPU 42 sets the value of the register t_aopon as the upper limit guard and stores the ignition angle t_aop in the register.

Figure 18:
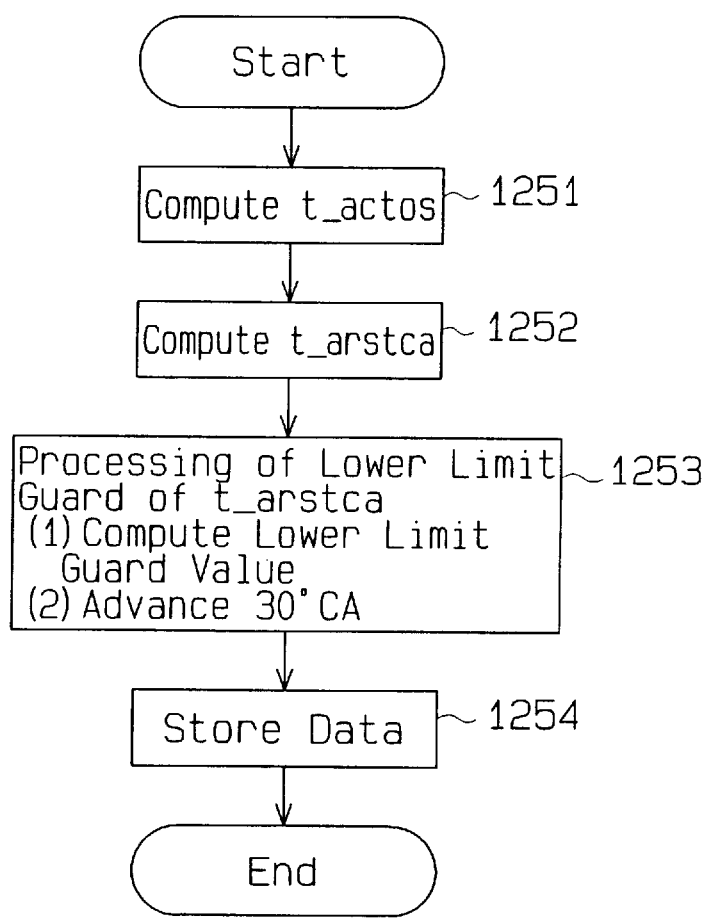
FIG. 18 is a flowchart showing a routine for computing the current flow commencement timing or current flow breakage timing and the remaining angle from the immediate ne interruption to the TDC.

At step 1640, the CPU 42 computes the timing of current flow breakage by executing the exacter (current flow commencement timing or current flow breakage timing) and earstca (the remaining angle from the immediate ne interruption to the TDC) computation routine, which is shown in FIG. 18.

At step 1650, the CPU 42 determines whether or not the current flow timing exacter computed in step 1640 is smaller than 30° CA. If the current flow timing exacter is equal to or greater than 30° CA, the CPU 42 determines that the present timing does not correspond to the ignition reservation timing and terminates this routine.

If the current flow timing exacter is smaller than 30° CA, the CPU determines that the present timing corresponds to the ignition reservation timing and proceeds to step 1660. This step is carried out to set the current flow breakage in correspondence with the immediate ne interruption.

Figure 10:
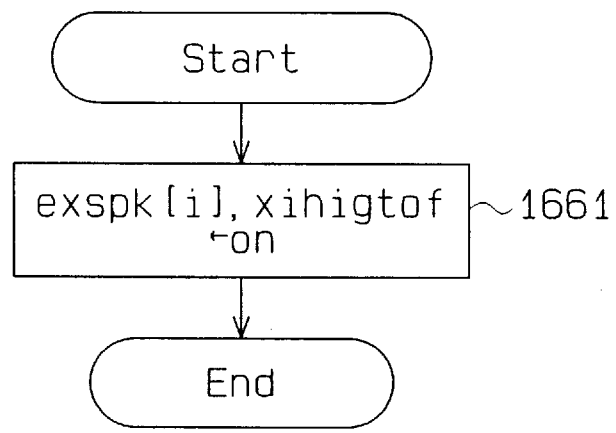
FIG. 10 is a flowchart showing a routine for manipulating exspk[].xihigtof flag.

At step 1660, the CPU 42 prohibits reservation until the next cycle by executing the exspki[].xihigtof flag manipulation routine, which is illustrated in FIG. 10.

When entering the routine of FIG. 10, at step 1661, the CPU 42 sets the exspk[i].xihigtof flag to ON and then terminates this routine. The i included in [] represents the identification number of the employed ignitor. Accordingly, the CPU 42 sets the xihigtof flag of the employed ignitor to ON.

After reservation of the current flow breakage timing, the CPU 42 prohibits the current flow breakage timing reservation until the next cycle.

At step 1670, the CPU 42 computes the ignition timing ezcprigt with the following equation:

$$ezcprigt = ezne301 + earstca * et3xon / EA30T0T - EESKLAG$$

In the equation, ezne301 represents the latch data of the 30° CA timing, earstca represents the remaining angle from the immediate ne interruption to the TDC, EA30T0T represents a constant for converting angle to time using et3xon, and et3xon represents the latch data of the time required for 30° CA. Furthermore, EESPKLAG represents a constant for retarding ignition in the hardware.

The CPU 42 then proceeds; to step 1680 and prohibits interruption.

At step 1690, the CPU 42 determines whether the IGT ON monitor flag exspk[t_idx].xigtm is set at ON. If the flag is set at ON, this indicates that there was IGT ON interruption in the previous cycle. In this case, the CPU 42 proceeds to step 1700 and reserves the ignition time. If the flag is set at OFF, the CPU 42 proceeds to step 1730.

When the CPU 42 proceeds to step 1700, there is current flow. Thus, the CPU 42 executes the current flow timing setting routine, which is illustrated in FIG. 5. After executing the setting routine, the CPU 42 proceeds to step 1710.

Figure 6:
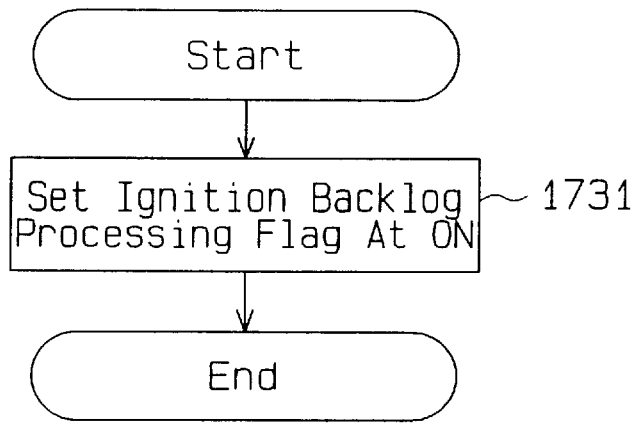
FIG. 6 is a flowchart showing a routine for processing ignition backlog.

If the CPU 42 proceeds to step 1730 from step 1690, the CPU 42 performs backlog shifting of IGT ON interruption. More specifically, the CPU 42 proceeds to step 1730 from step 1690 if there is no current flow. Thus, in step 1730, the CPU 42 executes the ignition backlog processing request routine, which is illustrated in FIG. 6, to carry out IGT ON interruption and perform backlog shifting.

When entering the ignition backlog processing request routine, the CPU 42 sets the ne interruption ignition backlog processing request flag xspkigt to ON in step 1731 and then terminates the request routine.

The sub-routines related to the ignition timing control routine are executed in the above manner.

Figure 4:
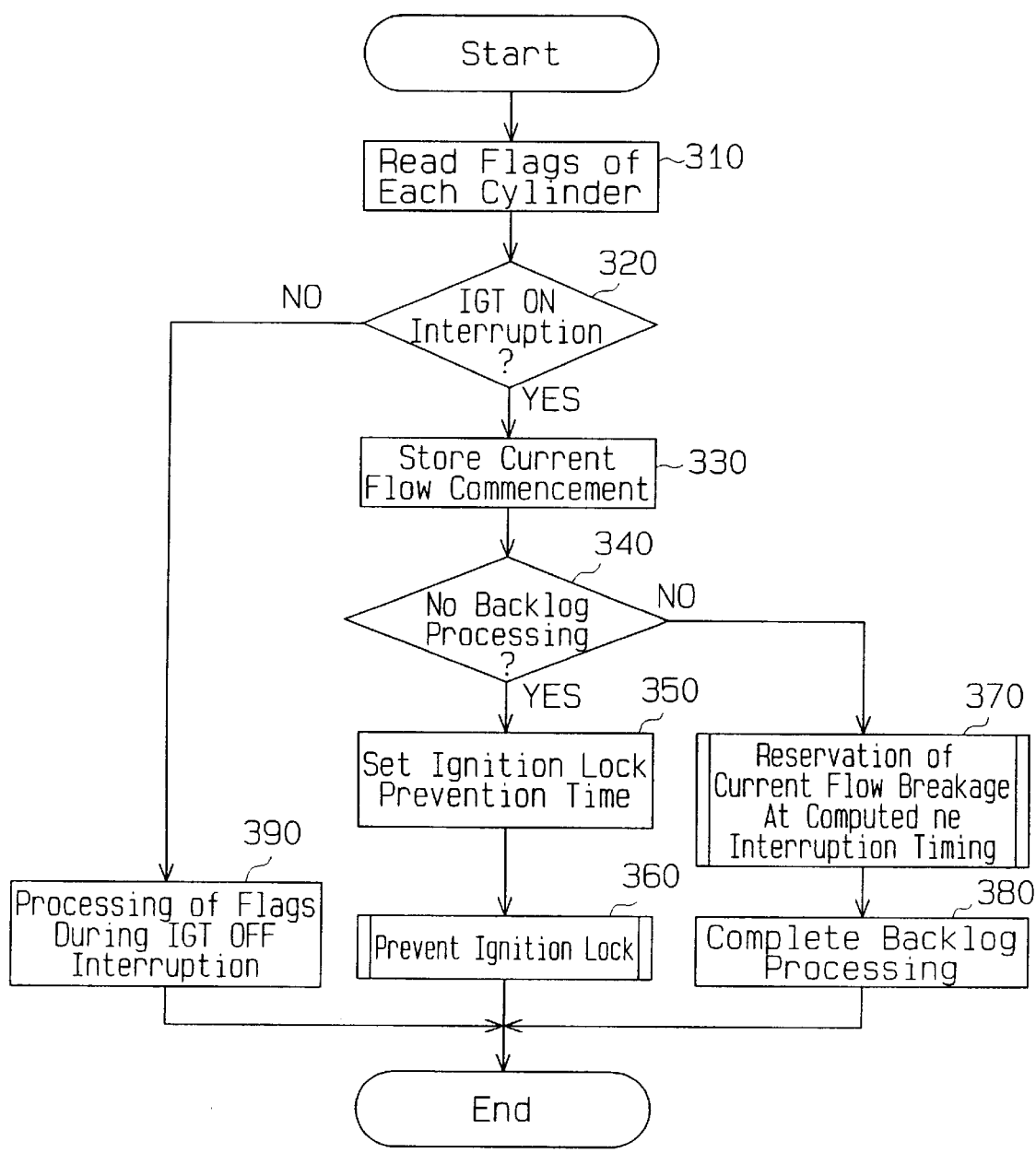
FIG. 4 is a flowchart showing a routine for confirmation of current flow breakage.

The current flow breakage confirmation routine will now be described with reference to the flowchart of FIG. 4. In this routine, if the ignitor (IGT) is actuated, the CPU 42 performs IGT ON interruption. If the ignitor is de-actuated, the CPU 42 performs IGT OFF interruption. Higher priority is given to IGT ON interruption and IGT OFF interruption in comparison with ne interruption.

When the ignitors 27A, 27B are actuated, the ignitors 27A, 27B commence current flow. When the ignitors 27A, 27B are de-actuated, the ignitors 27A, 27B break current flow. When the current flow is broken, the current flow to the primary side of the ignition coil 28 is shut off. This produces high secondary voltage in the secondary coil of the ignition coil 28 and ignites the spark plug 24, to which the ignitor 27A, 27B is connected.

When entering the current flow breakage confirmation routine, at step 310, the CPU 42 reads out the predetermined memory area of the RAM 43 at which the flags of each cylinder is stored. At step 320, the CPU 42 determines whether or not IGT ON interruption is being carried out based on the IGT ON monitor flag xigtm. If the IGT ON monitor flag xigtm is reset at OFF, the CPU 42 proceeds to step 330. If the IGT ON monitor flag xigtm is set at ON, the CPU 42 proceeds to step 390.

When the CPU 42 proceeds to step 330, the CPU 42 stores the commencement of current flow by setting the IGT ON monitor flag xigtm of the designated ignitor at ON. At step 340, the CPU 42 determines whether there is no backlog processing after ne interruption by confirming if the backlog processing request flag xspkigt is reset at OFF. When the backlog processing request flag xspkigt is reset at OFF in step 340, the CPU 42 proceeds to step 350. If the backlog processing request flag xspkigt is sat at ON in step 340, the CPU 42 proceeds to step 370.

When proceeding to step 350, the CPU 42 sets the lock prevention ignition time t_tclock for a state in which the engine is not starting. In this embodiment, the lock prevention ignition time t_tclock is set at 65.5 ms. If a starter signal gwsta is received from the starter switch 34, the lock prevention ignition time t_tclock, for a state in which the engine is starting, is extended to 131 ms.

At step 360, the CPU 42 performs lock prevention ignition processing. More specifically, at step 360, the CPU 42 executes the current flow timing setting routine.

When executing the current flow timing setting routine of FIG. 5, the CPU 42 prohibits interruption in step 1510. At step 1520, the CPU 42 sets the address of the timed output I/O function corresponding to the allocated number of the ignitor that is used. At step 1530, the CPU 42 stores the reservation time t_tim and the reservation phase t_phase of the ignitor port in the register of the corresponding timer.

Since the CPU 42 is carrying out step 360, the current flow breakage timing for the lock prevention ignition processing is reserved. The reservation timing t_tim is obtained by adding the predetermined lock prevention ignition time t_tclock to the IGT ON interruption timing. The reservation phase t_phase is set at OFF. These values are stored in the corresponding timer.

At step 1540, the CPU 42 permits interruption and then terminates the current flow timing setting routine. The CPU 42 then terminates the current flow commencement timing reservation routine.

After completing step 360, the CPU 42 temporarily terminates subsequent processing.

When the CPU 42 proceeds to step 370 from step 340, the CPU 42 reserves current flow breakage at the computed current flow breakage timing of ne interruption. More specifically, the CPU 42 executes the current flow timing setting routine, which is illustrated in FIG. 5, to reserve current flow breakage at the computed timing of ne interruption.

When entering the current flow timing setting routine, the CPU 42 carries out steps 1510 and 1520. The CPU 42 then proceeds to step 1530 and stores the reservation timing t_tim and the reservation phase t_phase of the ignitor port in the register of the corresponding timer. Since the CPU 42 is carrying out step 370, the current flow breakage timing for the lock prevention ignition processing is reserved. Thus, the reservation timing t_tim corresponds to the ignition timing ezcprigt obtained in step 1670 of the current flow breakage reservation routine, which is illustrated in FIG. 16. The reservation phaeg t_phase is set at OFF. These values are stored in the corresponding timer.

Afterwards, at step 1540, the CPU 42 permits interruption and then terminates the current flow timing setting routine. The CPU 42 then proceeds to step 380.

At step 380, the CPU 42 completes the backlog processing. More specifically, the CPU 42 resets the backlog processing request flag xspkigt to OFF and then temporarily terminates the current flow breakage confirmation routine.

When the CPU 42 proceeds to step 320 to step 390, the CPU 42 carries out the following processing of the IGT OFF interruption flags.

(1) Store current flow breakage The CPU 42 resets the IGT ON monitor flag xigtim to OFF (2) Shift ignition mode (a) When the after-starting recognition flag exastesa is set at ON, the CPU 42 sets the after-starting ignition recognition flag exspkast at ON.

(b) When the after-starting recognition flag exastesa is set at OFF, the CPU 42 sets the after-starting ignition recognition flag exspkast at OFF.

In this embodiment, the after-starting recognition flag exastesa Is set at ON when the engine speed ene exceeds 500 rpm. The after-starting recognition flag exastesa is reset at OFF when the engine speed ene becomes lower than 500 rpm. The flag exastesa is set in another routine in accordance with the engine speed ene.

In the current flow breakage confirmation routine, during IGT ON interruption, the IGT ON monitor flag xigtm is not yet reset at OFF when carrying out step 320. Thus, the CPU 42 proceeds to step 330 and sets the IGT ON monitor flag xigtm of the designated ignitor at ON and stores the current flow commencement.

During IGT OFF interruption, the IGT ON monitor flag xigtm is set at ON in step 320. In this case, the CPU 42 proceeds to step 390 and resets the IGT ON monitor flag xigtm to OFF. The CPU 42 then stores the current flow breakage. Thus, due to the ON/OFF of the ignitor, the CPU 42 proceeds from step 320 to step 330 in one cycle and then proceeds from step 320 to 390 in the next cycle. In this manner, steps 330 and 390 are carried out in an alternate manner.

The current flow breakage confirmation routine is executed for the following reasons. During IGT ON interruption, the CPU 42 performs OFF reservation to guarantee ignition. However, the reserved time (which is a value converted from an angle) computed during ne interruption may include a large error due to a sudden increase or sudden decrease in the engine speed. If the engine speed decreases suddenly after current flow commencement, the delay in reaching the OFF reservation angle results in excessive current flow. This may cause the engine to stall.

Furthermore, if the engine speed increases suddenly before current flow commencement, the ON reservation timing may be delayed with respect to the OFF reservation angle. Thus, if OFF reservation has not yet been performed, ignition may not occur. If ON interruption occurs before reaching OFF reservation angle, the CPU 42 executes tentative OFF reservation with the lock prevention ignition time. If ON interruption occurs after the OFF reservation angle, the CPU 42 sets the OFF reservation timing, which was not reserved during ne interruption, without making any corrections.

Figure 7:
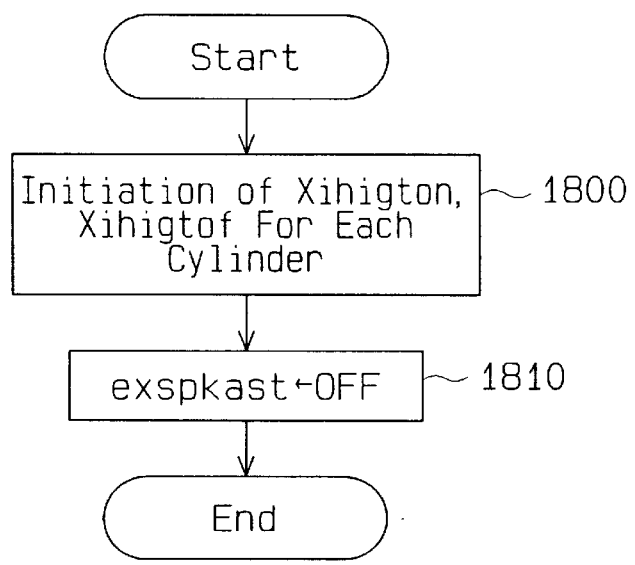
FIG. 7 is a flowchart showing a routine for processing engine stall.

The engine stall routine, which is carried out when the engine speed ene is zero, will now be described with reference to FIG. 7. This routine is executed to control the flags of each cylinder when the engine stalls, in which state there is no ne interruption.

When entering the routine, at step 1800, the CPU 42 initializes (resets to OFF) the IGT ON re-reservation prohibition flag xihigton flag of each cylinder (in this embodiment, each ignitor) and initializes (resets to OFF) the IGT OFF re-reservation flag xihigtof flag of each cylinder (in this embodiment, each ignitor). The CPU 42 then proceeds to step 1810 and resets the after-starting ignition recognition flag exspkast at OFF. The CPU 42 then terminates this routine.

In this embodiment, if the ignition timing control routine, which is illustrated in FIG. 3, is executed during the after-starting ignition mode, the CPU 42 carries out steps 10 to 50 and then proce eds to step 100. At step 110, if the present ignition timing control routine is not executed at a timing included in the ne interruption immediately before the TDC of the igniting cylinder, the CPU 42 proceeds to step 120. At step 120, the CPU 42 executes the current flow commencement timing reservation routine, which is illustrated in FIG. 15. In the reservation routine, the CPU 42 carries out steps 1210 to 1260 to compute the current flow commencement timing (step 1250). At step 1260, since the present timing is not included in the ne interruption immediately before the TDC of the igniting cylinder, the CPU 42 terminates the reservation routine.

Figure 21:
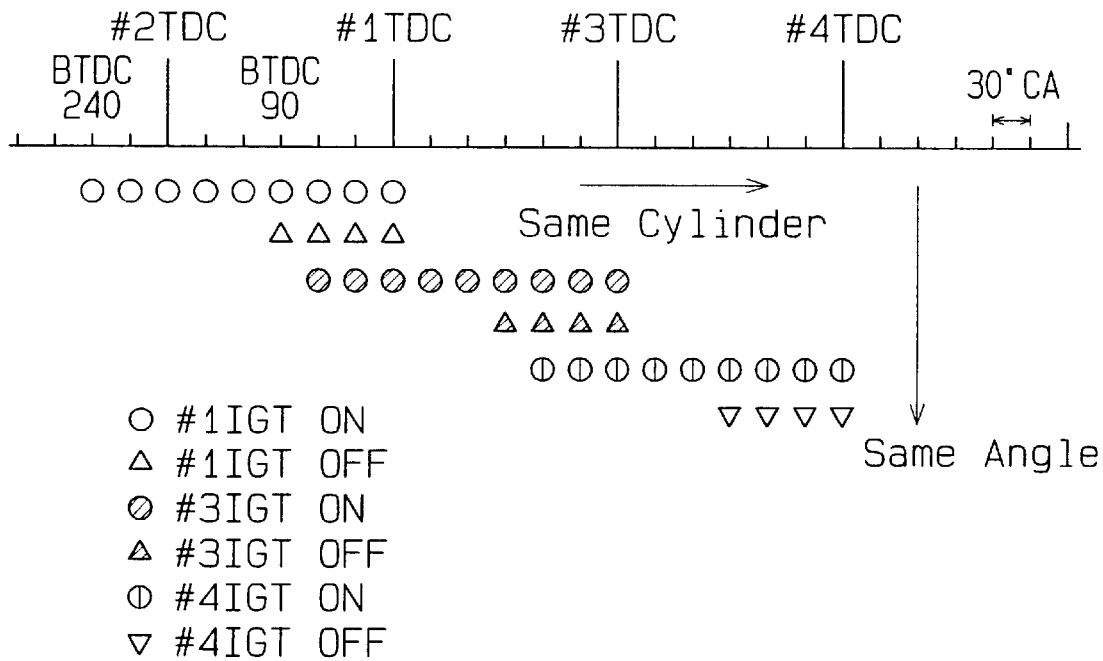
FIG. 21 ig an explanatory diagram showing the relationship of an IGT ON reservation permission and IGT OFF reservation permission in the igniting cylinder and the subsequent igniting cylinder.

Accordingly, in this embodiment, the current flow commencement timing is computed in every ne interruption (in this embodiment, every 30° CA). As shown in FIG. 21, when the first cylinder is the igniting cylinder, the current flow commencement timing is computed from BTDC 240° CA for every 30° CA. The phase of BTDC 240° CA is obtained in step 160. In step 160, the CPU 42 manipulates the IGT ON commencement timing of the subsequent cylinder when the reservation timing value of the subsequent cylinder reaches BTDC 240° CA.

In this manner, in the first embodiment, the current flow commencement timing is corrected during each cycle of the ignition timing control routine until the ne interruption immediately before the TDC. The CPU 42 computes the final current flow commencement timing in the ignition timing control routine executed during the ne interruption immediately before TDC. This minimizes error of the current flow commencement timing.

Furthermore, if the present timing corresponds to the ne interruption immediately before the TDC of the igniting cylinder in step 1260, the CPU 42 proceeds to step 1270 and prohibits current flow commencement timing reservation. At step 1280, the CPU 42 computes the current flow commencement timing and then proceeds to step 1300. If the conditions of step 1300 are not satisfied, the CPU 42 proceeds to step 1500 and sets the current flow commencement timing.

Consequently, current flow is continuously prohibited in the same cylinder (in this embodiment, the same ignitor) since reservation of current flow commencement timing is prohibited by step 1270 until executing the next cycle.

In this embodiment, at step 100, the CPU 42 latches the required time for the 30° CA immediately before the TDC of each cylinder. The latched value is then used to compute the dwell angle (converted angle value of continuous current flow time) in step 1230 of the current flow commencement time reservation routine, which is illustrated in FIG. 15. This improves the accuracy of the continuous current flow time.

When the ignition timing control routine is executed during the after-starting ignition mode, the CPU 42 resets the xihigtof flag to OFF in step 40 when at BTDC 90° CA. Thus, if ne interruption occurs after BTDC 90° CA and the CPU 42 carries out steps 120 to 140, the CPU 42 proceeds to step 150 to execute the current flow breakage timing reservation, which is illustrated in FIG. 16. In steps 1610 to 1640, the current flow breakage timing exacter and the remaining angle earstca (the angle from the immediate ne interruption to the TDC) are computed. At step 1650, if the present ne interruption is not the ne interruption immediately before the TDC of the igniting cylinder, the CPU 42 terminates the current flow breakage timing routine.

Thus, in this embodiment, the CPU 42 computes the current flow breakage timing for each ne interruption (30° CA) after BTDC 90° CA. For example, as shown in FIG. 21, if the first cylinder is the igniting cylinder, the current breakage timing is computed for every 30° CA after BTDC 90° CA as indicated by the triangles.

Accordingly, in the first embodiment, the current flow breakage timing is corrected during each cycle of the ignition timing control routine until the ne interruption immediately before the TDC of the igniting cylinder. The final current flow breakage timing is computed in the ignition timing control routine executed immediately before the ne interruption. This minimizes error of the current flow breakage timing.

Furthermore, if the CPU 42 carries out step 1650 during the ne interruption immedlately before the TDC, the CPU 42 proceeds to step 1660 and prohibits reservation of the ignition timing until the next cycle. At step 1670, the CPU 42 computes the ignition timing. At step 1690, if the IGT ON monitor flag is set at ON, this indicates that there was IGT ON interruption in the previous cycle. In this case, the CPU 42 proceeds to step 1700 and sets the ignition timing.

Therefore, since reservation of the ignition timing is prohibited until the next cycle in step 1660, succesive reservation of the ignition timing is prohibited in the same cylinder (in this embodiment, the same ignitor).

In the first embodiment, if the current flow breakage timing of the igniting cylinder is set in step 120 in the ignition timing control routine and the conditions of step 170 are satisfied in step 170, the CPU 42 makes the current flow commencement reservation for the subsequent cylinder. This enables current flow to overlap in the cylinders and increases the current flow time in the subsequent cylinder. If current flow does not overlap in the cylinders, current must flow in the subsequent cylinder during a short and limited time after current flow ends in the igniting cylinder. This requires a large amount of electric energy within a short period of time. This increases heat and necessitates a structure for resisting the heat. Thus, wires having a larger diameter become necessary. Furthermore, it may become necessary to increase the size of the ignition circuit. However, such heat is not produced in this embodiment. Thus, the structure of the present invention simplifies the structure of the circuit and decreases production cost.

In this embodiment, when the CPU 42 executes the ignition timing routine, the reservation of the current flow commencement timing and the reservation of the current flow breakage timing are performed separately. This enables current flow breakage (ignition) to be altered even after current flow commencement.

In this embodiment, during the execution of the current flow breakage confirmation routine, if the IGT ON interruption occurs before the OFF reservation angle, the CPU 42 carries out steps 340, 350, and 360 and sets the tentative OFF reservation angle in accordance with the lock prevention ignition time. This prevents excessive current flow that occurs when there is a delay in reaching the OFF reservation angle due to a sudden decrease in the engine speed.

Furthermore, in the current flow breakage confirmation routine, if the IGT ON interruption occurs after the OFF reservation angle, the CPU 42 carries out steps 340, 370, and 380 and sets the OFF reservation angle that was not reserved during the ne interruption without any corrections. This prevents non-ignition that occurs when the ON reservation timing comes after the OFF reservation angle.

In addition, in the current flow breakage confirmation routine, if the start signal gwsta is input when starting the engine, the CPU 42 sets the ignition lock prevention time t_tclock so that it is longer than when the engine has already been started. Thus, if the increase in engine speed is delayed when the engine is started, the long ignition lock prevention time t_tclock prevents quick current flow breakage. This prevents degradation of the starting performance of the engine 10. Furthermore, since the starting time (the starter ON time) is short, the influence of heat produced by excessive current flow is small.

A second embodiment according to the present invention will now be described with reference to FIGS. 26 to 28. The hardware structure of the second embodiment is the same as that of the first embodiment. However, the software structure of the second embodiment differs from that of the first embodiment. The second embodiment differs from the first embodiment in that overlapped current flow is not performed. The differing parts will be described below.

Figure 26:
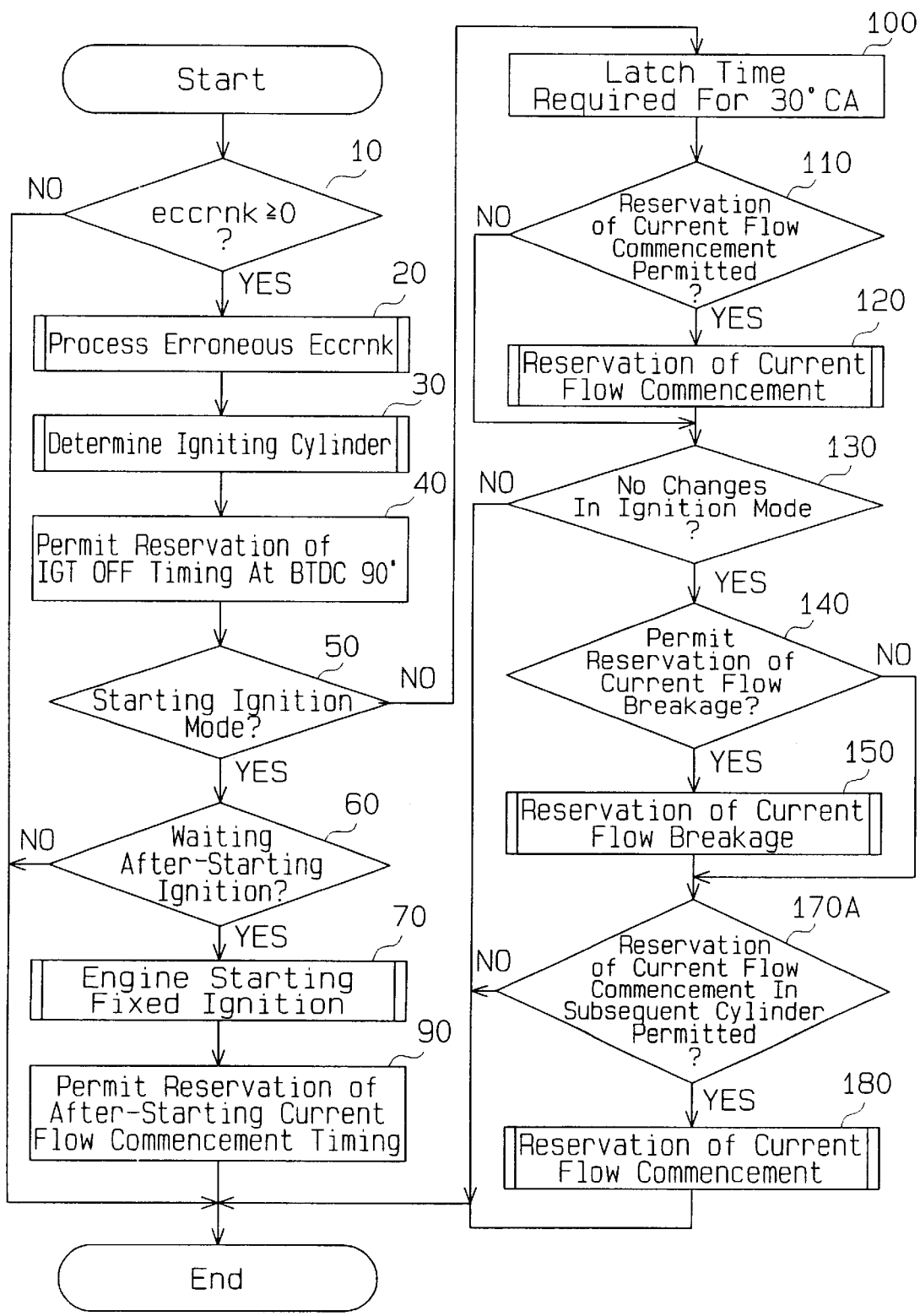
FIG. 26 is a flowchart showing a routine for controlling ignition timing in a second embodiment according to the present invention.

FIG. 26 illustrates the ignition timing control routine of the second embodiment, which is executed by the CPU 42. This routine differs from the ignition timing control routine of the first embodiment in that step 160 is eliminated and step 170 is replaced by step 170A.

In step 170A, the CPU 42 determines whether the following conditions are satisfied in step 170A before proceeding to step 180 to set the current flow commencement timing.

(1) The after-ignition IGT ON re-reservation flag xihigton of the subsequent cylinder is reset at OFF.

(2) The after-ignition IGT OFF re-reservation prohibition flag xihigtof of the igniting cylinder espki is set at ON.

When these two conditions are satisfied, immediately after starting of the engine, current flow commencement timing reservation of the subsequent cylinder is prohibited until making the current flow breakage reservation of the igniting cylinder.

If the conditions of step 170A are both satisfied, the CPU 42 proceeds to step 180 and sets the current flow commencement timing if the subsequent cylinder.

Figure 27:
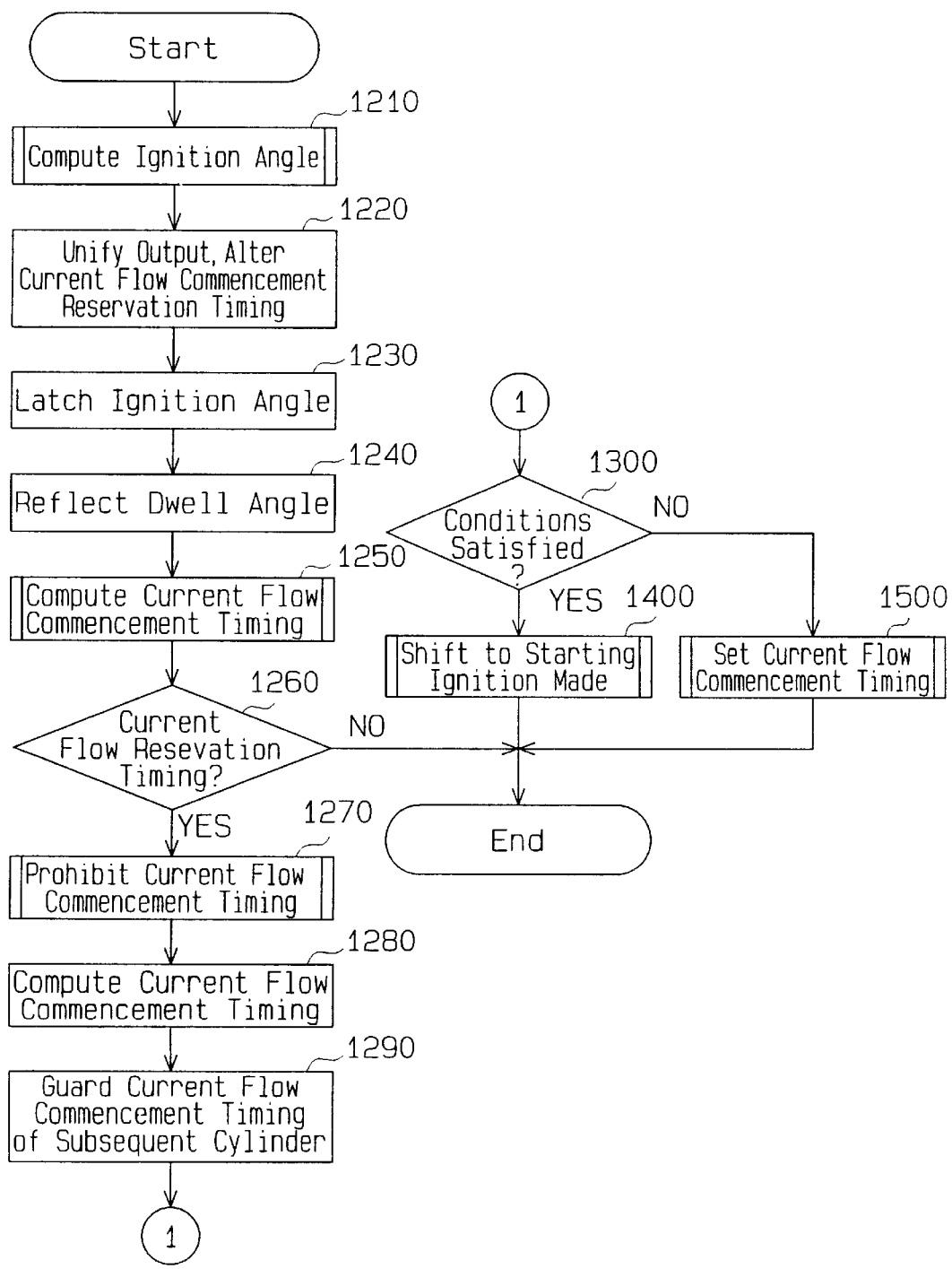
FIG. 27 is a flowchart showing a routine for reservation of current flow commencement timing.

FIG. 27 illustrates the current flow commencement timing reservation routine of the second embodiment. This routine differs from the current flow commencomont timing reservation routine of the first embodiment in that step 1290 is additionally included between step 1280 and step 1300.

At step 1290, the CPU 42 guards the current flow commencement timing from becoming earlier than the current flow breakage timing by adding allowance to the current flow time. This is carried out by setting the current flow commencement timing t_zcprigt to a value greater than a value obtained by adding the allowance time (constant) EIGTOF to the ignition timing ezcprigt.

Figure 28:
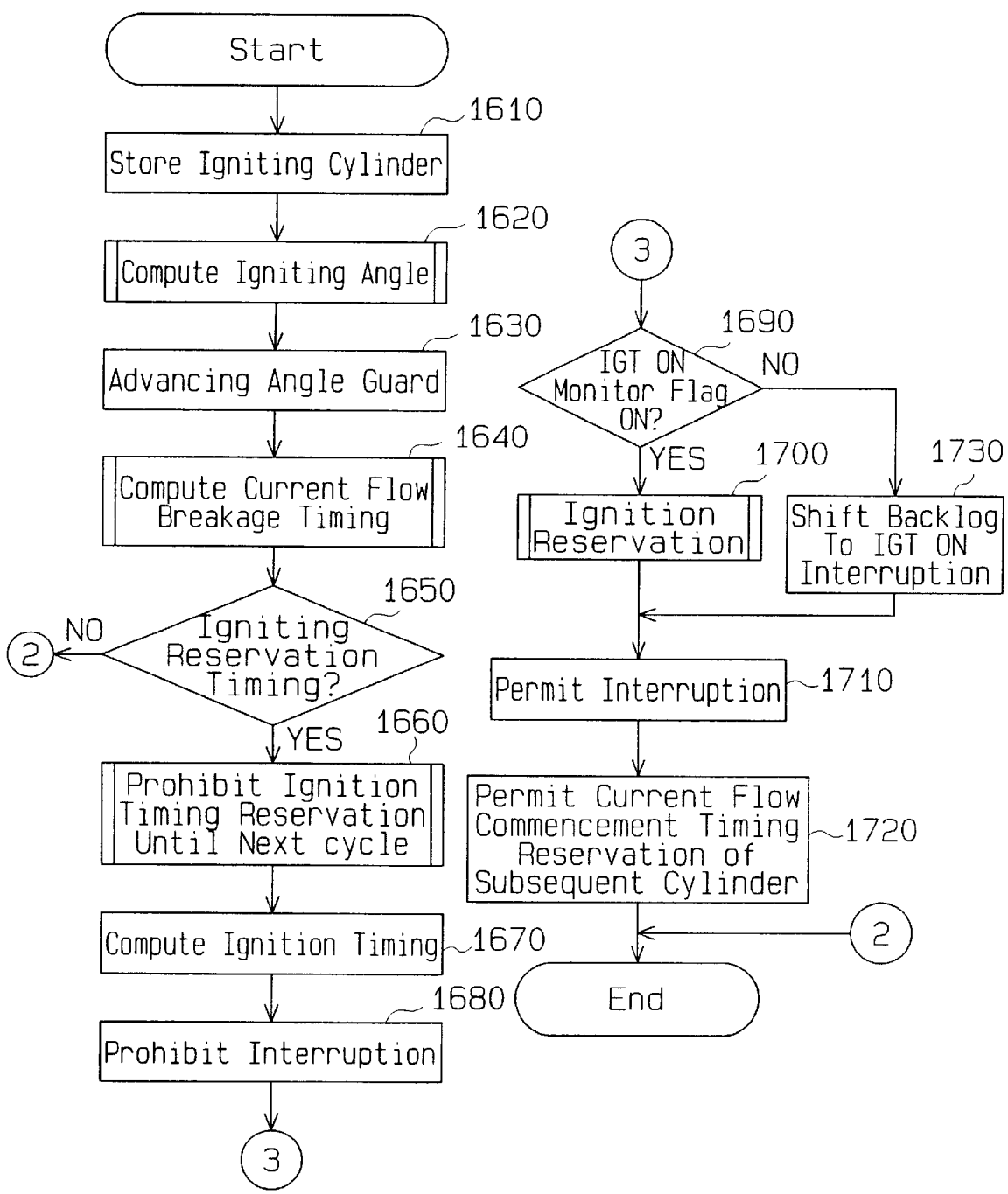
FIG. 28 is a flowchart showing a routine for reservation of current flow breakage.

FIG. 28 illustrates the current flow breakage timing reservation routine of a second embodiment according to the present invention. This routine differs from tho current flow breakage timing reservation routine of the first embodiment in that step 1720 is added after step 1710.

At step 1720, the CPU 42 permits reservation of the after-starting current flow commencement of the subsequent cylinder espkinxt. The after-starting IGT ON re-reservation prohibition flag xihigton of the subsequent cylinder espkinxt is reset to OFF. After carrying out step 1720, the CPU 42 terminates the current flow breakage timing reservation routine.

Accordingly, when the CPU 42 returns to step 170A, one of the conditions for permitting current flow commencement reservation in the subsequent cylinder is satisfied.

Consequently, in step 1290 of the current flow commencement timing reservation routine, which is illustrated in FIG. 27, lower limit guard is processed. Thus, overlapped current flow will not take place. This permits reservation of current flow commencement in the subsequent cylinder during the ignition timing control routine, which is executed in the same ne interruption, after the CPU 42 makes the current flow breakage reservation.

Accordingly, the second embodiment has the following advantageous effects. The accuracy of the continuous current flow time is improved and the current flow commencement timing (ignition timing) may be altered after commencing current flow. Excessive current flow that occurs when there is a delay in reaching the OFF reservation angle due to a sudden decrease in the engine speed is prevented. Non-ignition that occurs when the ON reservation timing comes after the OFF reservation angle is prevented.

Furthermore, in step 170A, immediately after starting of the engine, the reservation of the current flow commencement timing of the subsequent cylinder is prohibited until reservation of current flow breakage in the present igniting cylinder. Thus, immediately after starting of the engine, the current flow commencement timing of the subsequent cylinder can be set after setting the current flow breakage reservation of the present igniting cylinder.

The execution of step 1290 prevents the current flow commencement timing of the subsequent cylinder from becoming earlier than the current flow breakage timing of the present igniting cylinder.

A third embodiment according to the present Invention will now be descried with reference to FIGS. 29 to 40. Portions of tho hardware structure differing from the first embodiment will now be described. To avoid a redundant description, same or like elements are denoted with the same reference numerals.

Figure 29:
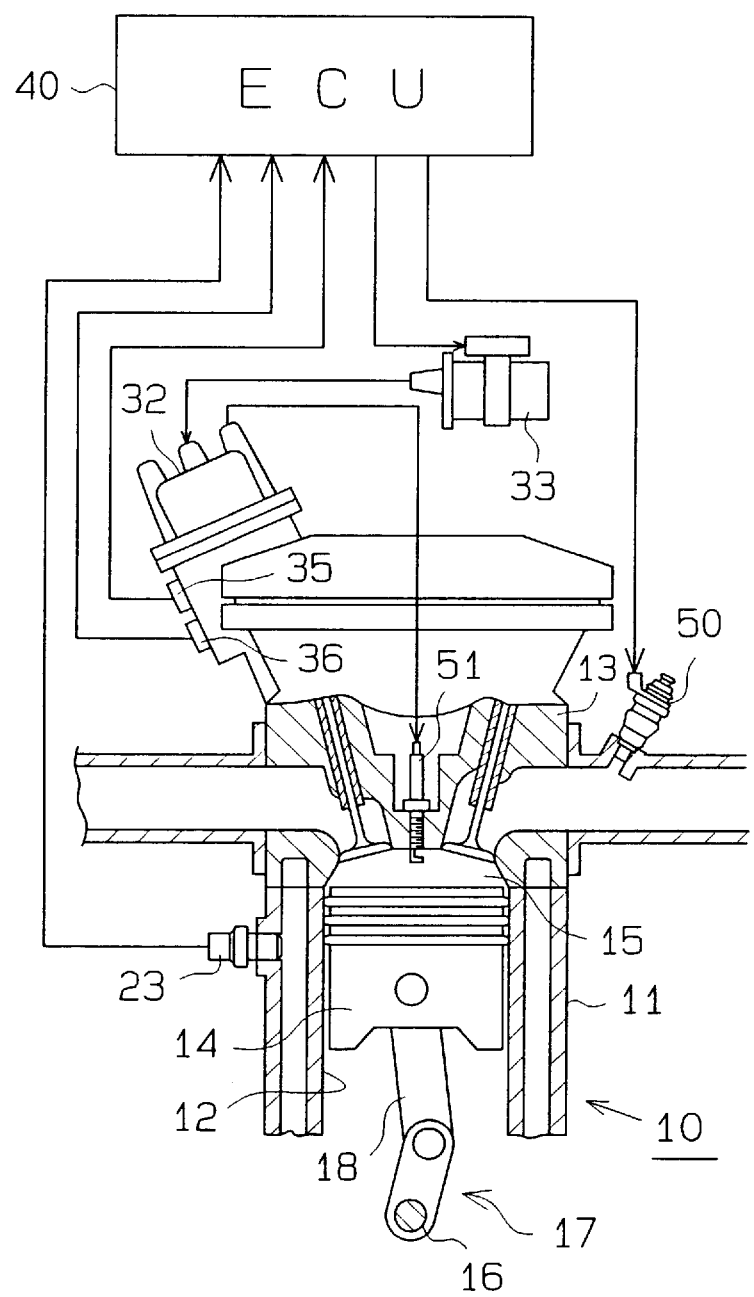
FIG. 29 is a schematic view showing an ignition timing controller according to a third embodiment of the present invention.

As shown in FIG. 29, the engine 10 is provided with a distributor 32. A rotor, which completes one rotation for every two rotations of the crankshaft 16, is incorporated in the distributor 32. An ignitor 33 is connected to an ECU 40. The ignitor 33 includes an ignition coil that produces high voltage when receiving a control signal from the ECU 40. As the rotor rotates, the distributor 32 distributes the high voltage of the ignitor 33 to the spark plug 51 of each cylinder. The voltage distribution is synchronized with the rotational phase of the crankshaft, or crank angle (° CA). The air fuel mixture drawn into each combustion chamber iS is burned when the associated spark plug 51 is ignited.

An engine speed sensor 35 is arranged in the distributor 32. The sensor 35 outputs a crank angle signal ne each time the crankshaft 16 rotates a predetermined angle (e.g., 30° CA). A crankshaft position sensor 36 is also arranged in the distributor 32. The sensor 36 outputs a crankshaft position signal G each time the crankshaft 16 rotates 360° CA.

Figure 30:
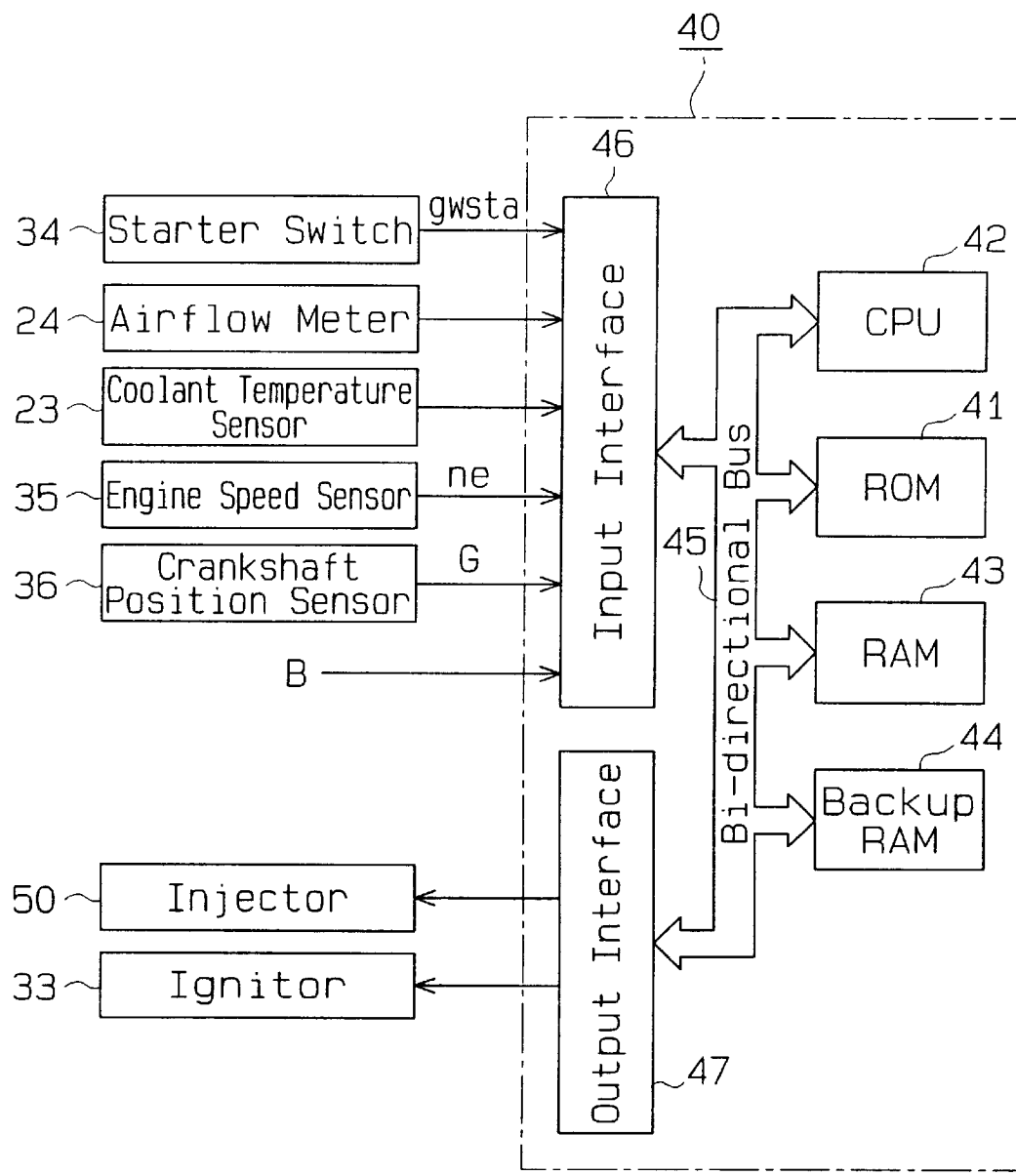
FIG. 30 is an electric block diagram showing the electric structure of an electronic control unit.

As shown in FIG. 30, the engine speed sensor 35, the crankshaft position sensor 36, and other sensors are connected to the input interface 46. The ignitor 33 is connected to the output interface 47.

Sensors 23, 24, 34, 35, 36 send detection signals to the CPU 42 by way of the input interface 46. The CPU 42 carries out various computations in accordance with the received signals to actuate the injector 50 and the ignitor 33 and control fuel injection and ignition timing.

Most of the routines executed in the third embodiment are identical to the routines executed in the first embodiment. Parts that differ from the first embodiment will now be described.

Figure 31:
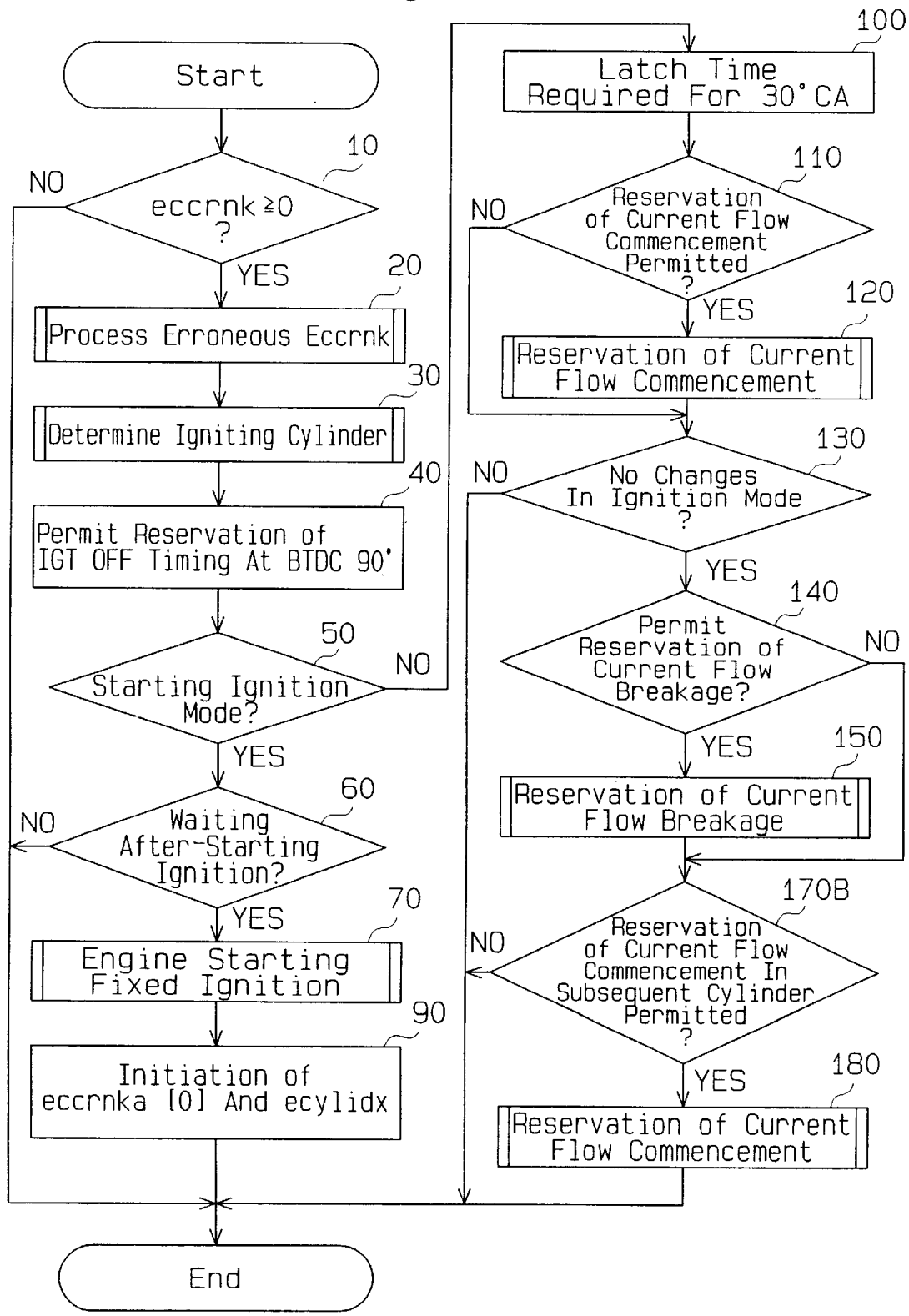
FIG. 31 is a flowchart showing a routine for controlling ignition timing in the third embodiment.

FIG. 31 illustrates the ignition timing control routine of the third embodiment executed by the CPU 42. The routine differs from the ignition timing control routine of the first embodiment illustrated in FIG. 3 in that step 160 is eliminated and step 170 is replaced by step 170B. Furthermore, step 80 is added after step 70.

At step 170B, the CPU 42 determines whether the following conditions for permitting reservation of the current flow commencement time in the subsequent cylinder are satisfied.

(1) The after-starting IGT ON re-reservation prohibition flag xihigton is reset at OFF.
(2) The IGT ON monitor flag xigtm of the igniting cylinder espki is reset at OFF.
(3) The ne interruption ignition backlog request flag xspkigt of the igniting cylinder espki is reset at OFF.
(4) The after-starting IGT OFF re-reservation prohibition flag xihigtof of the igniting cylinder espki is set at ON.

The above four conditions are the conditions that prohibit the current flow commencement timing reservation of the subsequent cylinder until the current flow breakage reservation of the igniting cylinder immediately after starting of the engine.

When all four conditions are satisfied, the CPU 42 proceeds to step 180 to set the current flow commencement timing for the subsequent cylinder.

Figure 38:
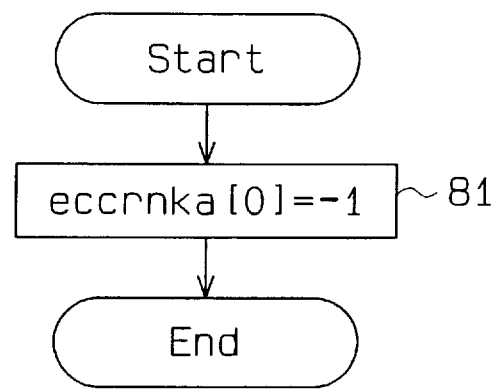
FIG. 38 is a flowchart showing a routine for initializing eccrnka.

When the CPU 42 proceeds to step 80 from step 70, the CPU 42 executes the eccrnka initialization routine, which is illustrated in FIG. 38. When entering this routine, at step 81, the CPU 42 initializes the angle eccrnka[0], which is the angle between the present angle and the TDC, to minus one. The CPU 42 then terminates this routine. At step 80, the CPU 42 further initializes the cylinder recognition code ecylidx, which is used to compute the retarding compensation amount of each cylinder. Since it is determined that ignition has not yet been performed in step 60, the CPU 42 initializes the angle eccrnka[0]. After completing step 80, the CPU 42 temporarily terminate the ignition timing control routine.

Figure 32:
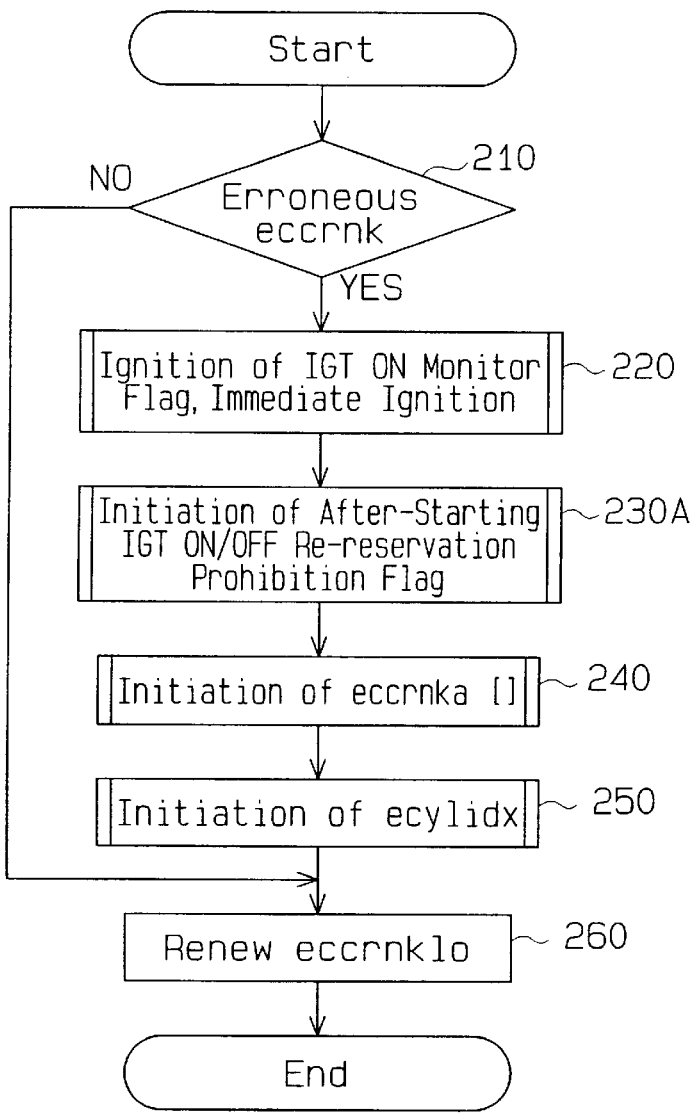
FIG. 32 is a flowchart showing a routine for processing erroneous crank counter eccrnk.

FIG. 32 shows the erroneous crank counter eecrnk processing routine of the third embodiment executed by the CPU 42. This routine differs from the erroneous crank counter eecrnk processing routine of the first embodiment illustrated in FIG. 11 in that step 230 is replaced by step 230A and that steps 240 and 250 are added between step 230A and step 260.

Figure 33:
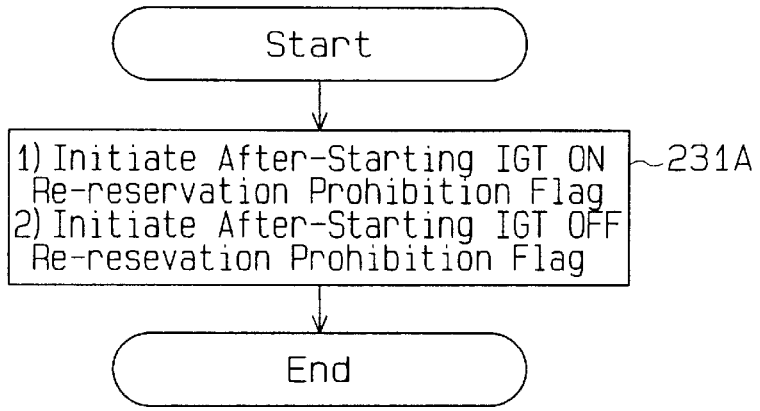
FIG. 33 is a flowchart showing in detail the contents of one of the steps in FIG. 32.

FIG. 33 is a flowchart illustrating step 230A in detail. As shown in the flowchart, at step 231A, the CPU 42 sets the after-starting IGT ON re-reservation prohibition flag xihighton of the igniting cylinder to OFF and sets the after-starting IGT ON re-reservation prohibition flag corresponding to the subsequent cylinder to ON.

Figure 37:
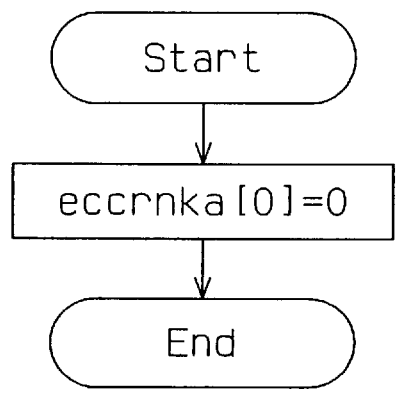
FIG. 37 is a flowchart showing a routine for initializing eccrnka.

At step 240, the CPU 42 executes the eccrnka initialization routine, which is illustrated in FIG. 37. In this routine, the CPU 42 initializes the angle eccrnka[0], which is the angle between the present position and the TDC, to zero. The CPU 42 then terminates the routine.

At step 250, the CPU 42 initializes the cylinder recognition code ecylidx, which ie used to compute the retarding compensation amount of each cylinder, in the same manner as step 80. The CPU 42 then proceeds to step 260 and terminates the erroneous crank counter control routine.

When the engine 10 is provided with the distributor 32 and if there is an error in the crank count eccrnk, the CPU 42 initializes the angle eccrnka[0] between the present position and the TDC of tho igniting cylinder.

Figure 34:
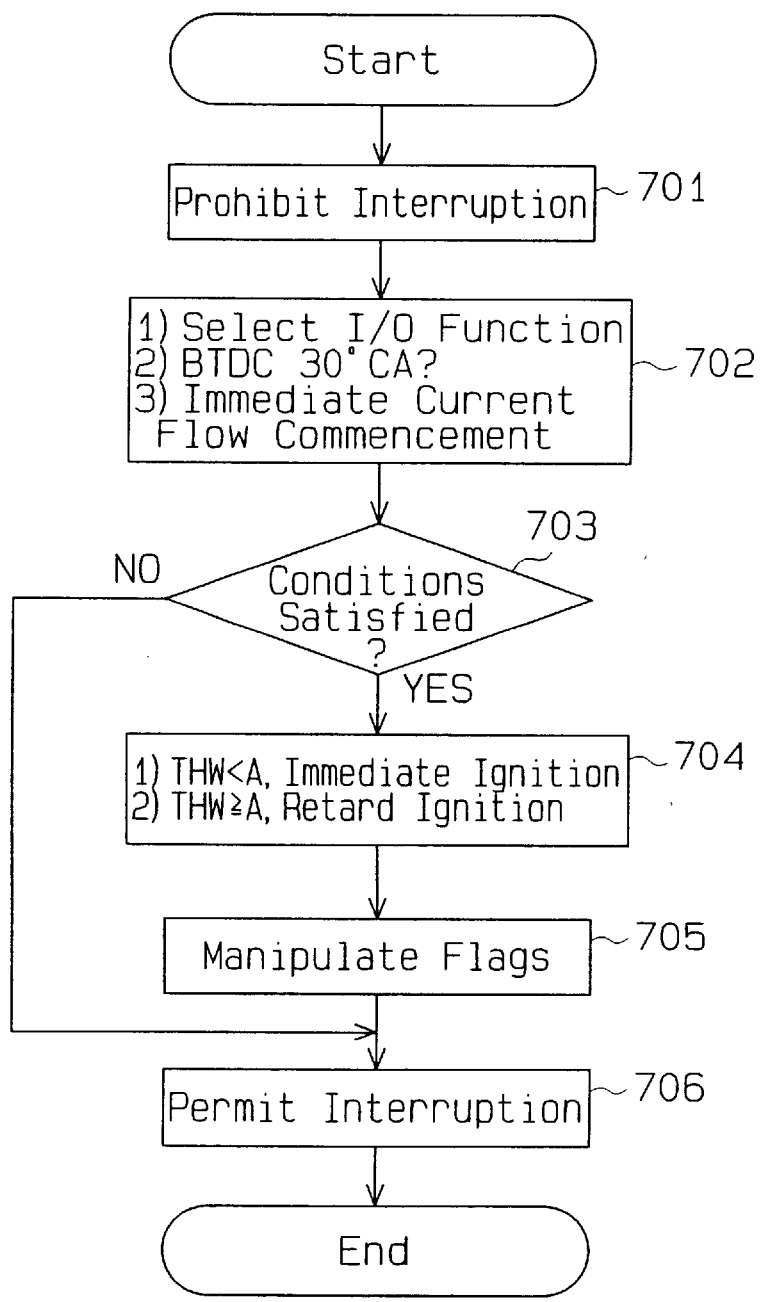
FIG. 34 is a flowchart showing a routine for processing starting fixed ignition.

The engine starting fixed ignition routine is illustrated in the flowchart of FIG. 34. This routine differs from the engine starting fixed routine of the first embodiment in that step 705 is additionally included between step 704 and step 706.

At step 705, the CPU 42 executes the following processing.

(1) Processing of flags related to the igniting cylinder.

The CPU 42 executes the xihigton manipulating routine, which is illustrated in FIG. 9, to carry out the following processing:

$$\text{exspk[i].xihigton} \leftarrow \text{t\_phase}$$

In the equation, i represents the igniting cylinder espki and t_phase is set at ON. In this processing, the after-starting IGT ON re-reservation prohibition flag xihigton of the igniting cylinder is set at ON. This processing causes the CPU 42 to jump from step 130 to step 110 to prohibit the current flow commencement timing reservation of step 120 during execution of the ignition timing control routine in the next ne interruption after reservation of the starting ignition.

(2) Processing of flags related to the subsequent cylinder.

In the same manner as the first processing, the CPU 42 executes the xihigton manipulating routine, which is illustrated in FIG. 9, to carry out the following processing:

$$\text{exspk[i].xihigton} \leftarrow \text{t\_phase}$$

In the equation, i represents the igniting cylinder espkinxt and t_phase is set at OFF. In this processing, the after-starting IGT ON re-reservation prohibition flag xihigton of the subsequent igniting cylinder is set at OFF. This processing causes the CPU 42 to proceed from step 170 to step 180 to permit reservation of the current flow commencement timing when the ignition timing control routine is executed during the next ne interruption after reservation of the starting ignition.

(3) Processing of flags related to the igniting cylinder.

The CPU 42 executes the exspk[].xihigtof flag manipulation routine, which is shown in FIG. 10. More specifically, in step 1661, the CPU 42 sets the exspk[i].xihigtof flag to ON. The CPU 42 then terminates this routine. The i included in the brackets represents the number of the igniting cylinder. The xihigtof flag, which is set at ON, corresponds to the employed igniter. This processing causes the CPU 42 to jump from step 140 to step 160 and prohibit reservation of the current flow breakage timing in step 180 when the ignition timing control routine is executed during the next ne interruption after reservation of the starting ignition.

In the third embodiment, which employs the distributor 32, if the state of the engine changes from starting to after-starting, the CPU 42 skips steps 120 and 150 and executes the current flow commencement timing of step 180 only once if the ignition timing control routine during the ne interruption is executed when the crank count eccrnk is erroneous or when the igniting cylinder has been ignited.

Figure 35:
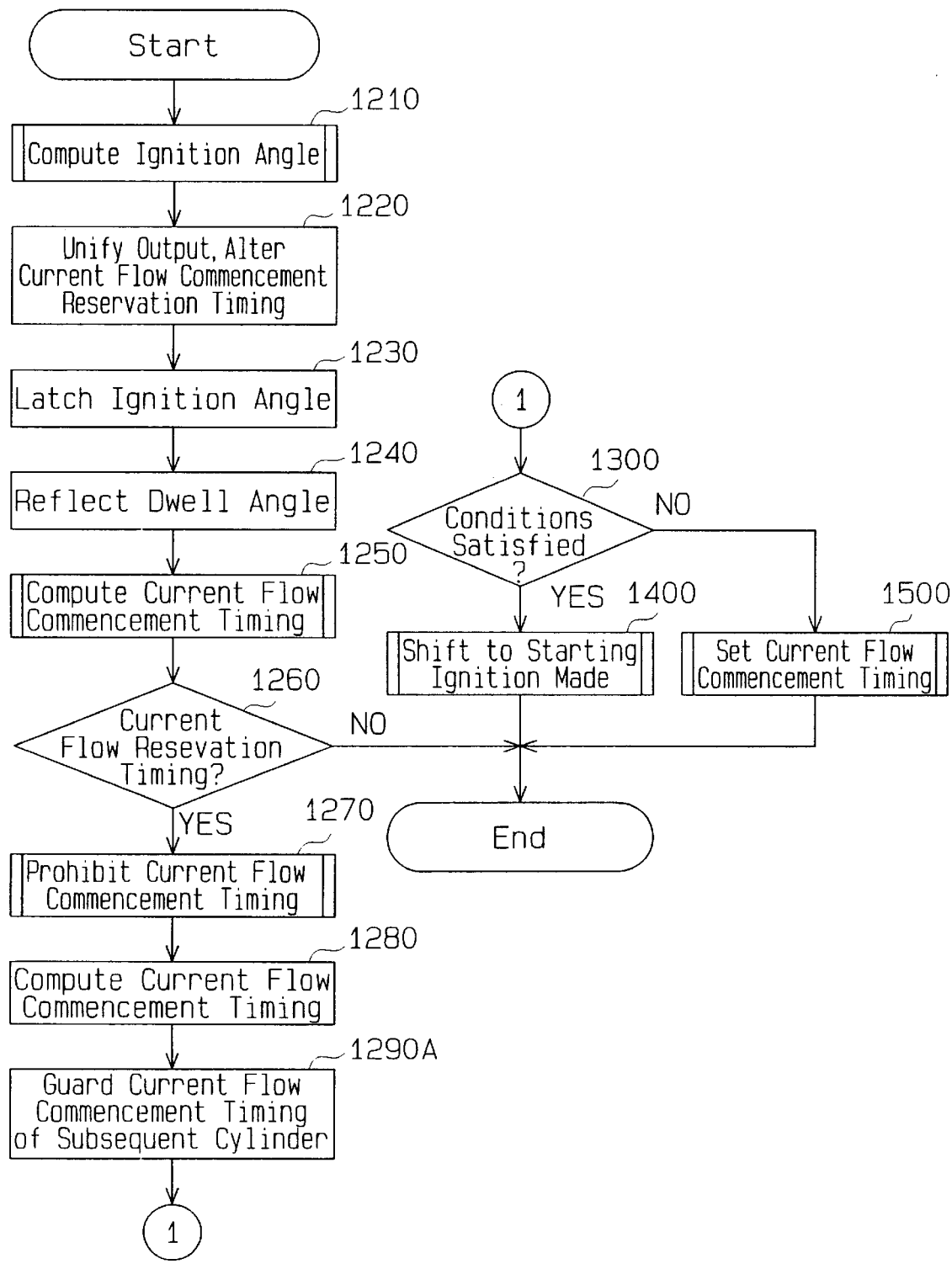
FIG. 35 is a flowchart showing a routine for reservation of current flow commencement timing.

The current flow commencement timing reservation routine of the third embodiment that is executed in steps 120 and 180 during the ignition timing control routine of FIG. 31 will now be described with reference to FIG. 35.

This routine differs from the current flow commencement timing reservation routine of the first embodiment in that step 1220 is added between steps 1210 and 1230 and that step 1290A is added between step 1280 and step 1300.

At step 1220, the CPU 42 carries out tho following processing to unify output and to alter the current flow commencement reservation timing.

(1) Fix arrangement.

The CPU 42 sets the igniting cylinder number t_idx to zero. This unifies the output and the cylinder number to distribute the high voltage from the ignitor 33 to the spark plug 51 of each cylinder with the distributor 32.

(2) Prohibition of current flow commencement timing reservation of the subsequent cylinder during the present ne interruption.

The CPU 42 executes the xihigton manipulation routine, which is illustrated in FIG. 9, and carries out the following processing:

$$exspk[i].xihigton \leftarrow t\_phase$$

In the above processing, i represents the subsequent igniting cylinder espkinxt and t_phase is set at ON. During the processing, the after-starting IGT ON re-reservation prohibition flag xihigton of the igniting cylinder is set at ON. More specifically, the after-ignition IGT ON re-reservation prohibition flag xihigton ot the igniting cylinder is set at ON. This causes the CPU 42 to proceed from step 170B to step 180 to prohibit current flow commencement timing reservation of the subsequent cylinder when the ignition timing control routine is executed in the present ne interruption.

(3) Permit current flow commencement timing reservation of the igniting cylinder during the next ne interruption In the same manner as the second processing, the CPU 42 executes the xihigton manipulation routine, which is illustrated in FIG. 9, and carries out the following processing:

$$exspk[i].xihigton \leftarrow t\_phase$$

In the above processing, i represents the igniting cylinder espki and t_phase is set at OFF. More specifically, the after-ignition ICT ON re-reservation prohibition flag xihigton of the igniting cylinder is set at OFF. This causes the CPU 42 to proceed from step 110 to step 120 to permit current flow commencement timing reservation when the ignition timing control routine is executed in the present ne interruption.

At step 1290A, the CPU 42 carries out lower limit guard when computing current flow commencement timing of the subsequent cylinder. To carry out the lower limit guard, the CPU 42 sets the subsequent current flow commencement timing t_zcprigt of the subsequent cylinder at a value that is greater than a value obtained by adding allowance time (constant: one-dimensional interpolation value) to the ignition timing ezcprigt of the igniting cylinder. The one-dimensional interpolation value is obtained in accordance with the present engine speed from a one-dimensional map stored in the ROM 41.

Step 1290A is carried out to guard the current flow timing by giving it allowance. This prevents the current flow commencement timing of the subsequent cylinder from becoming earlier than the current flow breakage time.

Figure 36:
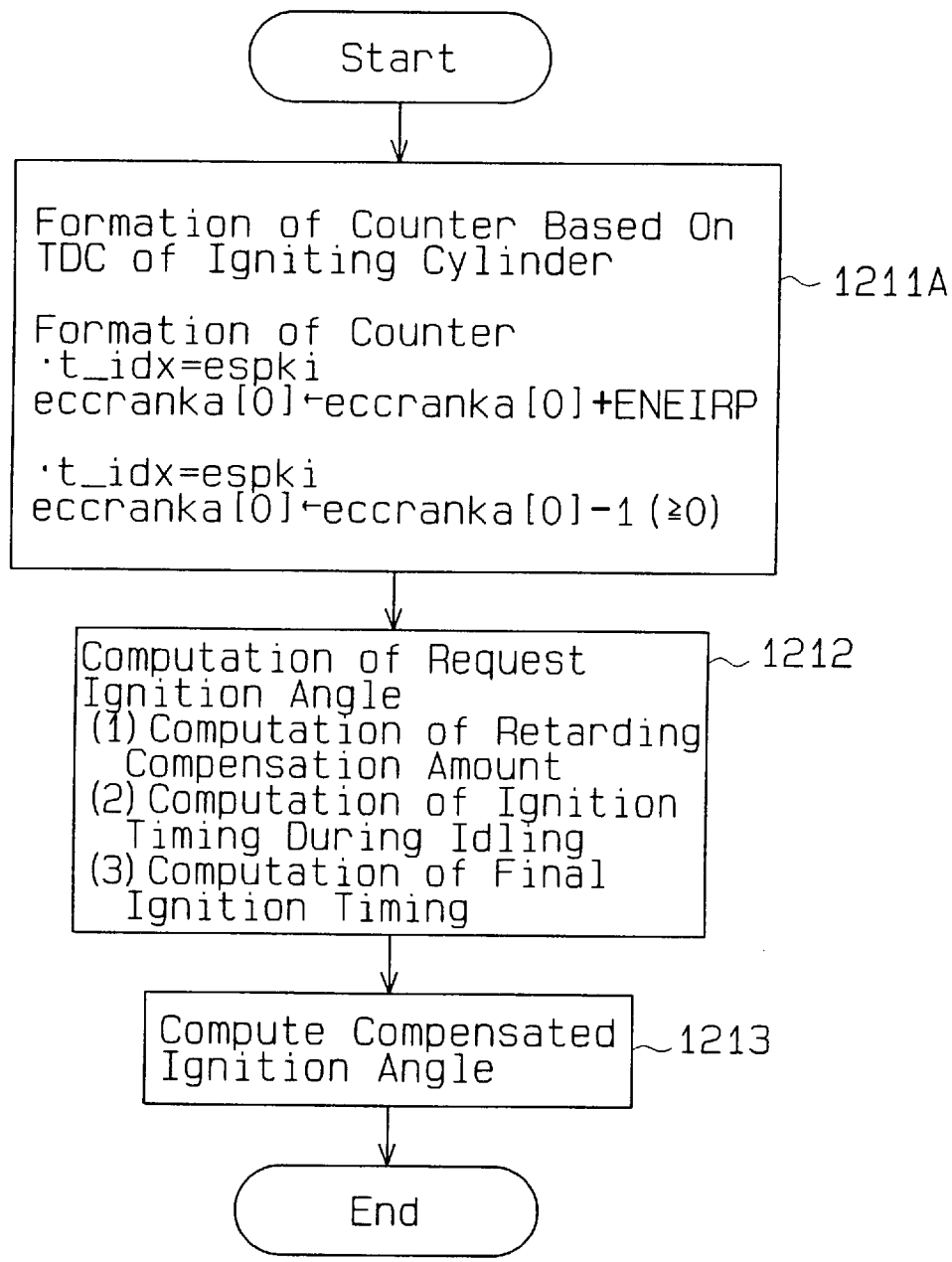
FIG. 36 is a flowchart showing a sub-routine for computing ignition angle.

The ignition angle computation routine executed in step 1210 of FIG. 35 will now be described with reference to FIG. 36. In this routine, at step 1211A, the CPU 42 forms the count eccrnka[0] based on the TDC of the igniting cylinder. More specifically, the following processes are carried out.

(1) Form of counter

Overlapped amount is corrected during overlapped timing. Overlapped timing refers to a state in which the cylinder recognition code t_idx of the cylinder that is to be energized does not correspond to the recognition code of the igniting cylinder (t_idx≠espki). When overlapped timing is confirmed, the CPU 42 computer eccrnka[0]+ENEIRP and renews the eccrnka[0] with the obtained value. ENEIRP represents the number of ne interruptions between the TDC of successive cylinders. If there are four cylinders, ENEIRP represents the value of six. If there are six cylinders, ENEIRP represents the value of four.

If the cylinder recognition code t_idx corresponds to the igniting cylinder espki (t_idx=espki), the CPU 42 carries out the following processing:

$$eccrnka[0]=eccrnka[0]-1 (\geq 0)$$

When the engine 10 is provided with the distributor 32, a counter (the angle between the present position and the TDC of the igniting cylinder) is formed.

Figure 39:
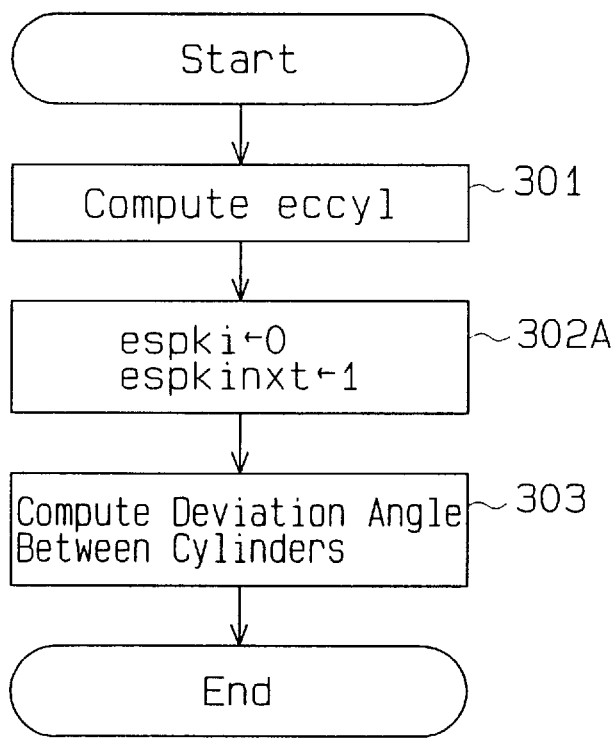
FIG. 39 is a flowchart showing a routine for determining the igniting cylinder.

In the ignition timing control routine illustrated in FIG. 31, the CPU 42 executes the igniting cylinder determination routine, which is illustrated in FIG. 39, at step 30. This routine differs from the ignition timing cylinder determination routine of the first embodiment in that step 302A is carried out in lieu of step 302.

Since there is only one ignitor, at step 302A, tho CPU 42 fixes the igniting cylinder recognition code espki and the subsequent igniting cylinder code espkinxt in the following manner.

(1) espki=0
(2) espkinxt=1

The CPU 42 executes the other routines based on these fixed codes.

Figure 40:
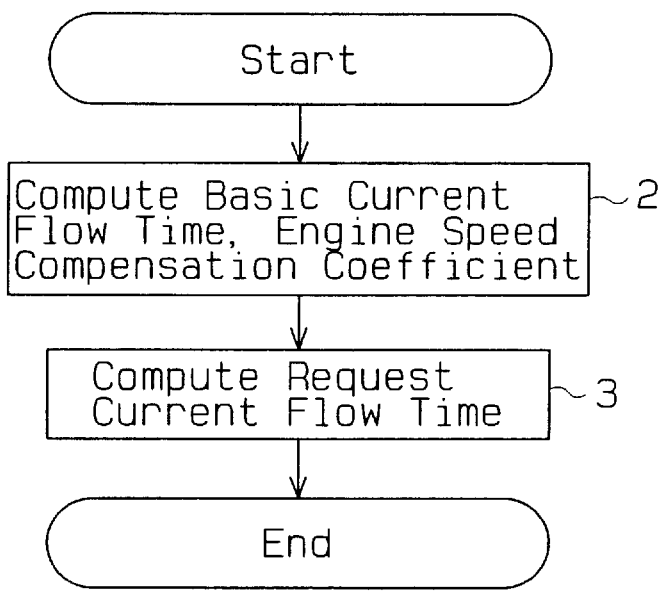
FIG. 40 is a flowchart showing a main routine of the third embodiment.

In the third embodiment, the main routine executed by the CPU 42 is illustrated in the flowchart of FIG. 40.

When entering this routine, at step 2, the CPU 42 computes the interpolation value to obtain the basic current flow time by referring to a one-dimensional map stored in the ROM 41. Furthermore, the CPU 42 obtains the engine speed compensation coefficient corresponding to the crank angle signal ne by referring to a one-dimensional map stored in the ROM 41. At step 3, the CPU 42 multiplies the basic current flow time and the engine speed compensation coefficient to compute the request current flow time etigton. The CPU 42 stores the computed value in the predetermined register and then temporarily terminates this routine.

Accordingly, the following advantages are obtained in the third embodiment. The accuracy of the continuous current flow time is improved and the current flow commencement timing (ignition timing) may be altered after commencing current flow. Excessive current flow that occurs when there is a delay in reaching the OFF reservation angle due to a sudden decrease in the engine speed is prevented. Non-ignition that occurs when the ON reservation timing comes after the OFF reservation angle is prevented.

Furthermore, in the third embodiment, the CPU 42 guards the current flow commencement timing of the subsequent cylinder in step 1290A when executing the current flow commencement timing reservation routine. This prevents the current flow commencement timing of the subsequent cylinder from becoming earlier than the current flow breakage timing of the present igniting cylinder.

It should be apparent to those skilled in the art that the present invention may be embodied in many other specific forms without departing from the spirit or scope of the invention. More particularly, the present invention may be embodied in the following modes.

In the above embodiments, the ignition timing control routine is executed in accordance with the ne interruption that takes place every 30° CA. However, this routine may be executed in accordance with crank angle intervals other than 30° CA.

The number of engine cylinders is not limited to four or six. Thus, the present invention may be applied to engines having any number of cylinders.

Therefore, the present examples and embodiments are to be considered as illustrative and not restrictive and the invention is not to be limited to the details given herein, but may be modified within the scope and equivalence of the appended claims.

What is claimed is:

1. An apparatus for controlling an ignition timing in association with rotation of an engine that has an ignitor, an ignition coil and a spark plug, wherein said ignitor provides the ignition coil with primary current to actuate the ignition coil, and wherein said ignition coil provides the spark plug with secondary current to actuate the spark plug when the primary current is cut off, said apparatus comprising:

detecting means for detecting the rotation of the engine by a predetermined angle, said detecting means outputting a first signal based on the detection;

computing means for computing an ignition timing of the ignition coil, said computing operation being performed based on the first signal and driving state of the engine, wherein said computing means outputs a second signal to the ignitor to control the primary current provided to the ignition coil;

prohibiting means for prohibiting a provision of the primary current to the ignition coil when the primary current is provided to the ignition coil for a first predetermined time period; and setting means for setting a second predetermined time period that is larger than the first predetermined time period, said prohibiting means prohibiting the provision of the primary current to the ignition coil based on the second predetermined time period when the engine starts to work.

2. The apparatus as set forth in claim 1, wherein said computing means computes a target time period for providing the primary current to the ignition coil, wherein said prohibiting means prohibits the provision of the primary current based on selected one of the predetermined time periods regardless of the target time period when the target time period is larger than the selected one of the time periods.

3. The apparatus as set forth in claim 2, further comprising:

a plurality of cylinders that are ignited in turn; and specifying means for specifying a cylinder to be ignited according to the first signal.

4. The apparatus as set forth in claim 3, further comprising a crank shaft integrally rotatable with the engine, wherein said detecting means includes a sensor for sensing the rotation of the crank shaft by the predetermined angle.

5. The apparatus as set forth in claim 4, wherein said prohibiting means prohibits the provision of primary current to the ignition coil from the ignitor for preventing the ignitor from being over-heated and damaged.

6. The apparatus as set forth in claim 5, further comprising an electronic control unit that forms said computing means, said prohibiting means, said setting means and said specifying means.

7. An apparatus for controlling an ignition timing in association with rotation of an engine that has an ignitor, an ignition coil and a spark plug, wherein said ignitor provides the ignition coil with primary current to actuate the ignition coil, wherein said ignition coil provides the spark plug with secondary current to actuate the spark plug when the primary current is cut off, and wherein said spark plug ignites a plurality of cylinders in turn said apparatus comprising:

detecting means for detecting the rotation of the engine by a predetermined angle, said detecting means outputting a first signal based on the detection;

specifying means for specifying a cylinder to be ignited according to the first signal;

computing means for computing an ignition timing of the ignition coil and a target time period for providing the primary current to the ignition coil, said computing operation being performed based on the first signal and driving state of the engine, wherein said computing means outputs a second signal to the ignitor to control the primary current provided to the ignition coil;

prohibiting means for prohibiting a provision of the primary current to the ignition coil when the primary current is provided to the ignition coil for a first predetermined time period; and setting means for setting a second predetermined time period that is larger than the first predetermined time period, said prohibiting means prohibiting the provision of the primary current to the ignition coil based on the second predetermined time period when the engine starts to work, wherein said prohibiting means prohibits the provision of the primary current based on selected one of the predetermined time periods regardless of the target time period when the target time period is larger than the selected one of the time periods.

8. The apparatus as set forth in claim 7, further comprising a crank shaft integrally rotatable with the engine, wherein said detecting means includes a sensor for sensing the rotation of the crank shaft by the predetermined angle.

9. The apparatus as set forth in claim 8, wherein said prohibiting means prohibits the provision of primary current to the ignition coil from the ignitor for preventing the ignitor from being over-heated and damaged.

10. The apparatus as set forth in claim 9, further comprising an electronic control unit that forms said computing means, said prohibiting means, said setting means and said specifying means.

* * * * *